United States Patent [19]

Wright et al.

[11] 4,092,162
[45] May 30, 1978

[54] NITROGEN CONTAINING POLYMERS AND USE IN PHOTOCONDUCTIVE ELEMENTS

[75] Inventors: Hal Eldon Wright, Rochester; Martin Alfred Berwick, Kendall, both of N.Y.

[73] Assignee: Eastman Kodak Company, Rochester, N.Y.

[21] Appl. No.: 753,389

[22] Filed: Dec. 22, 1976

[51] Int. Cl.$^2$ .............................................. G03G 5/07
[52] U.S. Cl. ................................. 96/1.5 N; 96/1.6; 260/75 N; 260/75 S
[58] Field of Search ................. 260/75 N; 96/1.5, 1.6

[56] References Cited

U.S. PATENT DOCUMENTS

| | | | |
|---|---|---|---|
| 3,066,117 | 11/1962 | Thoma et al. | 260/75 N |
| 3,861,915 | 1/1975 | Cawley | 96/1.5 |
| 3,884,690 | 5/1975 | Radler | 96/1.5 |
| 3,925,074 | 12/1975 | Wyhof | 96/1.5 X |
| 3,992,203 | 11/1976 | Horhold et al. | 96/1.5 |
| 4,012,376 | 3/1977 | Wright | 96/1.5 X |

*Primary Examiner*—Roland E. Martin, Jr.
*Attorney, Agent, or Firm*—J. R. Everett

[57] ABSTRACT

Novel polymeric compounds having utility in multiactive photoconductive insulating elements. Such elements have at least two layers comprising an aggregate photoconductive layer in electrical contact with a photoconductor-containing layer.

The aggregate photoconductive layer comprises at least one novel polymeric compound having the structure:

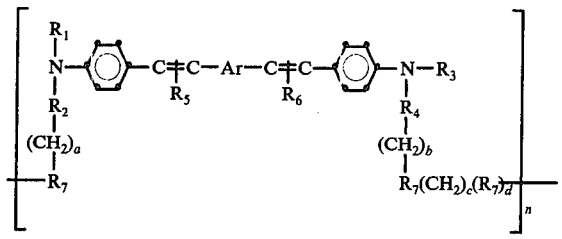

wherein $R_1$, and $R_3$, which may be the same or different, represent a substituted or unsubstituted alkyl group having from 1 to 18 carbon atoms or a substituted or unsubstituted aryl group;

$R_2$, and $R_4$, which may be the same or different, represent an alkylene group having from 2 to 10 carbon atoms or a substituted or unsubstituted arylene group;

$R_5$ and $R_6$ which may be the same or different, represent hydrogen or an electron withdrawing group;

$R_7$ can represent oxy, imino, thio, oxycarbonyl, iminocarbonyl, carbonyldioxy, ureylene, carbonyloxycarbonyl, sulfonyl, iminosulfonyl, iminocarbonyloxy;

Ar is an unsubstituted or a substituted arylene group wherein said substituent is an electron accepting group or an electron withdrawing group;

$a$, $b$ and $c$ are whole numbers of from 1 to 25;

$d$ is 0 or 1; and $n$ is a whole number having a value of at least 2.

16 Claims, No Drawings

NITROGEN CONTAINING POLYMERS AND USE IN PHOTOCONDUCTIVE ELEMENTS

FIELD OF THE INVENTION

This invention relates to novel sensitizers and their utility in photoconductive compositions, and elements.

BACKGROUND OF THE INVENTION

Electrophotographic imaging processes and techniques have been extensively described in both the patent and other literature, for example, U.S. Pat. Nos. 2,221,776; 2,277,013; 2,297,691; 2,357,809; 2,551,582; 2,825,814; 2,833,648; 3,220,324; 3,220,831; 3,220,833 and many others. Generally, these processes have in common the steps of employing a photoconductive insulating element which is prepared to respond to imagewise exposure with electromagnetic radiation by forming a latent electrostatic charge image. A variety of subsequent operations, now well-known in the art, can then be employed to produce a permanent record of the image.

Various types of photoconductive insulating elements are known for use in electrophotographic imaging processes. In many conventional elements, the active components of the photoconductive insulating composition are contained in a single layer composition. This composition is typically placed in electrical contact affixed, with a conductive support during the electrophotographic imaging process.

Among the many different kinds of photoconductive compositions which may be employed in typical single active layer photoconductive elements are inorganic photoconductive materials such as vacuum evaporated selenium, particulate zinc oxide dispersed in a polymeric binder and homogeneous organic photoconductive compositions composed of an organic photoconductor solubilized in a polymeric binder, and the like.

The use of two or more active layers in a photoconductive element has been discussed in the patent literature. Such multi-active-layer photoconductive elements are sometimes referred to hereinafter simply as "multi-active" photoconductive elements. A partial listing of representative patents discussing or at least alluding to "multi-active" photoconductive elements includes: Hoesterey, U.S. Pat. Nos. 3,165,405; Bardeen, 3,041,166 issued June 26, 1962; Makino, 3,394,001 issued July 23, 1968; Makino et al., 3,679,405 issued July 25, 1972; Hayaski et al., 3,725,058 issued Apr. 3, 1973; Canadian Pat. No. 930,591 issued July 24, 1973; Canadian Pat. Nos. 932,197-199 issued Aug. 21, 1973; and British Pat. Nos. 1,343,671 and 1,337,228.

Although there has been a fairly extensive description of specific types of multi-active photoconductive elements in the literature, various shortcomings still exist in these elements so that there is a need to investigate alternative kinds of multi-active elements. For example, the multi-active elements described in the aforementioned Hoesterey patent suffer from the disadvantages of generally low speed and difficult to clean zinc oxide materials in both active layers of the element. Other multi-active elements such as those described in Canadian Pat. Nos. 930,591 and 932,199 appear to be primarily designed for use in a positive charging mode of operation and therefore may not generally be suitable for use in an electrophotographic process in which a negative charging mode is employed.

Co-pending Mey, U.S. Ser. No. 641,058 filed Dec. 15, 1975, discloses a multi-active photoconductive insulating element having at least two layers comprising an inorganic photoconductor-containing layer in electrical contact with an aggregate photoconductive layer. Co-pending Berwick et al., U.S. Ser. No. 639,039 filed Dec. 9, 1975, discloses a multi-active photoconductive insulating element having at least two layers comprising an aggregate or charge generation layer in electrical contact with an organic photoconductor-containing or charge-transport layer. The aggregate photoconductive layer of both Mey and Berwick et al., includes a continuous electrically insulating polymer phase having dispersed therein a finely divided, particulate co-crystalline complex containing at least one pyrylium-type dye salt and at least one polymer having an alkylidene diarylene group in a recurring unit.

The aggregate layer used in both Mey and Berwick et al. are of the type described in Light, U.S. Pat. No. 3,615,414. Typically, it has its principle absorption band for radiation in the visible region of the spectrum within the range of from about 520 nm to about 700 nm. Within this range the aggregate layer provides an exceptional level of sensitivity. However, below 520 nm, especially in the region of 460 nm, the aggregate layer exhibits low absorption thereby lowering the overall efficiency of such multi-active elements for white light exposure as well as decreasing the ability of such elements to discriminate red copy from a white background. Clearly, there exists need in the art for multi-active photoconductive elements comprising an aggregate photoconductive layer which has greater sensitivity in the region of the visible spectrum below about 520 nm especially in the blue region of the spectrum around 460 nm.

SUMMARY OF THE INVENTION

We have discovered a new class of polymeric compounds which when incorporated into the aggregate photoconductive layer of a multi-active photoconductive element, results in an increase in the electrophotographic sensitivity of the element. These novel polymeric compounds have the following formula:

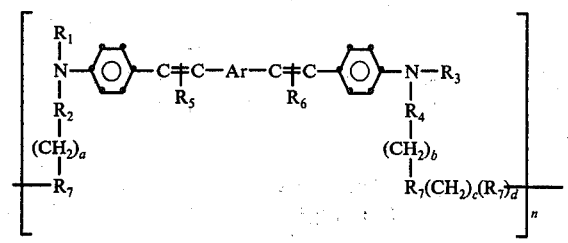

wherein $R_1$ and $R_3$, which may be the same or different, represent a substituted or unsubstituted alkyl group having from 1 to about 18 carbon atoms or a substituted or unsubstituted aryl group;

$R_2$ and $R_4$, which may be the same or different, represent an alkylene group having from 2 to about 10 carbon atoms or a substituted or unsubstituted arylene group;

$R_5$ and $R_6$ which may be the same or different represent hydrogen or an electron withdrawing group;

$R_7$ can represent oxy, imino, thio, oxycarbonyl, iminocarbonyl, carbonyldioxy, ureylene, carbonyloxycarbonyl, sulfonyl, iminosulfonyl, iminocarbonyloxy;

Ar is an unsubstituted or a substituted arylene group wherein said substituent is an electron donating group or an electron withdrawing group;

a, b and c are whole numbers of from 1 to about 25;

d is 0 or 1, and n is a whole number having a value of at least 2.

According to one aspect of the present invention, there is provided a multi-active photoconductive insulating element comprising an aggregate layer having an enhanced response across a wide area of the blue region of the visible spectrum.

According to another aspect of the invention, there is provided multi-active photoconductive insulating elements comprising an aggregate layer having synergistic sensitivity in the blue region of the visible spectrum.

According to another aspect of this invention, there is provided a multi-active active photoconductive element comprising an aggregate layer having an improved panchromatic response in the visible region.

According to another aspect of the present invention, there is provided a multi-active photoconductive elements comprising an aggregate layer which exhibit a high level of response in the blue region of the visible spectrum upon both rear and front exposures.

U.S. Pat. Nos. 3,873,311 and 3,873,312 discloses a class of distyryl-containing aromatic compounds which are useful in increasing the sensitivity of single layer aggregate photoconductive compositions to the blue region of the visible spectrum. However, such compounds are not usually active over the entire window region extending from about 430 to about 500 nm, where aggregate photoconductive compositions exhibit very low absorption. Many of these compounds cease to effectively absorb light energy for wavelengths greater than 470 nm as well as exhibiting relatively low levels of blue absorption. It was therefore surprising to discover that many of the compounds used in the present invention are effective in increasing the sensitivity of multi-active photoconductive elements comprising an aggregate layer throughout the 430 to 500 nm "window" region of the visible spectrum. Also, the monomeric form of many compounds used in the present invention do not increase the sensitivity of the single layer aggregate elements of U.S. Pat. Nos. 3,873,311 as well as the distyryl-containing aromatic organic photoconductors disclosed in 3,873,311. Surprisingly, however, some of the polymeric compounds cause a synergistic increase in the sensitivity and absorption of multi-active elements comprising an aggregate photoconductive layer.

U.S. Patent 3,246,983 discloses a class of substituted vinylene organic photoconductors. However, there is no disclosure therein regarding the use of such photoconductors as sensitizers for aggregate photoconductive layers. Moreover, many of the compounds disclosed therein are photoconductors are ineffective as photoconductors.

U.S. Pat. No. 3,653,887 discloses a class of α,α'bis-(aminobenzylidene)arylydiacetonitrile photoconductors. This patent broadly discloses that photoconductive layers containing such compounds may be sensitized by wide variety of sensitizers including, "aggregate type sensitizers". However, it does not teach that the disclosed photoconductors may be useful in enhancing the sensitivity of multi-active photoconductive elements comprising aggregate photoconductive layers.

The multi-active photoconductive element of the invention may be employed as the image-forming member in a variety of electrophotographic processes, including transfer electrophotographic processes, employing a reusable photoconductive element; non-transfer electrophotographic processes wherein a final visible image is formed on a non-reusable photoconductive element; the so-called TESI processes (i.e., Transfer of ElectroStatic Images) such as described by R. M. Schaffert in the book entitled *Electrophotography*, at pp. 87–96, The Focal Press, New York (1965); etc. For convenience and purposes of illustration, the multi-active photoconductive element of the invention will be described herein with reference to its use in conventional electrophotographic processes in which an electrostatic charge image is formed at or near the surface of the photoconductive element by employing the now well-known steps of (a) applying a uniform electrostatic charge to the top surface of the photoconductive insulating element in the absence of activating radiation while the bottom surface of the element is maintained at a suitable reference potential, thereby creating an electric field through the photoconductive element and (b) imagewise exposing the photoconductive element to activating radiation. However, it will be appreciated by those familiar with the art that the multi-active element of the invention may also be advantageously employed in a wide variety of other known electrophotographic processes. For a greater understanding of multi-active photoconductive elements comprising aggregate photoconductive layers the reader is directed to co-pending applications in the name of Mey, U.S. Pat. Nos. 641,058 filed Dec. 15, 1975 and Berwick, 639,039 filed Dec. 9, 1975, which are expressly incorporated herein by reference.

The term "activating radiation" as used in the present specification is defined as electromagnetic radiation which is capable of generating electron-hole pairs in the aggregate photoconductive layer and/or the inorganic photoconductor containing layer upon exposure thereof. Thus, for an example, when the aggregate photoconductive layer is exposed to activating radiation, charge carriers, i.e. electron-hole pairs, are photogenerated therein.

The multi-active photoconductive element of the present invention may be employed in electrophotographic processes using either positive or negative charging of the photoconductive element. Typically, when the multi-active photoconductive element is employed in an electrophotographic process, the element is affixed, either permanently or temporarily, on a conductive support. In such case, by appropriate selection of the photoconductor material included in the photoconductor containing layer, the multi-active element is capable of providing useful electrostatic charge images when used in either a positive or negative charge mode, regardless of whether the aggregate photoconductive layer or the photoconductor containing layer is located adjacent the conductive support.

DESCRIPTION OF THE PREFERRED EMBODIMENTS

Particularly useful polymeric compounds of the present invention have the formula:

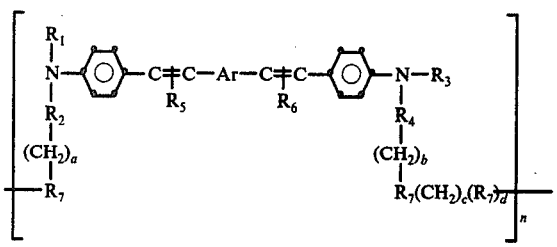

wherein $R_1$, and $R_3$ may be the same or different represent a substituted or unsubstituted alkyl group group have from 1 to about 18 carbon atoms, or a substituted or unsubstituted aryl group;

$R_2$ and $R_4$, which may be the same or different, represent an alkylene group having from 2 to about 10 carbon atoms or a substituted or unsubstituted arylene group;

$R_5$ and $R_6$ may be the same or different represent hydrogen or an electron withdrawing group selected from the group consisting of —CN, —CF$_3$, —NO$_2$, —CO$_2$R$_8$, —SO$_2$F wherein $R_8$ is an alkyl group having from 1 to about 12 carbon atoms;

$R_7$ can represent oxy, imino, thio, oxycarbonyl, iminocarbonyl, carbonyldioxy, ureylene, carbonyloxycarbonyl, sulfonyl, iminosulfonyl, iminocarbonyloxy;

Ar represents a substituted or unsubstituted arylene group such as phenylene, naphthylene, and anthrylene wherein said substituent is selected from the group consisting of hydrogen, —CN, —CO$_2$R$_9$, —OR$_9$, —CF$_3$, —NO$_2$, —Cl, —SR$_9$ and —R$_9$;

$R_9$ is an alkyl group having from 1 to about 12 carbon atoms;

$a$, $b$ and $c$ are whole numbers from 1 to about 25;

$d$ is 0 or 1; and $n$ is a whole number having a value of from about 2 to about 150.

Typically, $R_1$, and $R_3$ may represent any of the following alkyl or aryl groups, $R_2$ and $R_4$ may represent the equivalent alkylene or arylene groups.

1. an alkyl group having one to about 18 carbon atoms e.g., methyl, ethyl, propyl, butyl, isobutyl, octyl, dodecyl, etc. including a substituted alkyl group having one to about 18 carbon atoms such as
   a. alkoxyalkyl e.g., ethoxypropyl, methoxybutyl, propoxymethyl, etc.,
   b. aryloxyalkyl e.g., phenoxyethyl, naphthoxymethyl, phenoxypentyl, etc.,
   c. aminoalkyl, e.g., aminobutyl, aminoethyl, aminopropyl, etc.,
   d. hydroxyalkyl e.g. hydroxypropyl, hydroxyoctyl, etc.,
   e. aralkyl e.g., benzyl, phenethyl, etc.,
   f. alkylaminoalkyl e.g., methylaminopropyl, methylaminoethyl, etc., and also including dialkylaminoalkyl e.g., diethylaminoethyl, dimethylaminopropyl, propylaminooctyl, etc.,
   g. arylaminolkyl, e.g., phenylaminoalkyl, diphenylaminoalkyl, N-phenyl-N-ethylaminopentyl, N-phenyl-N-ethylaminohexyl, naphthylaminomethyl, etc.,
   h. nitroalkyl, e.g., nitrobutyl, nitroethyl, nitropentyl, etc.,
   cyanoalkyl, e.g., cyanopropyl, cyanobutyl, cyanoethyl, etc.,
   j. haloalkyl, e.g., chloromethyl, bromopentyl, chlorooctyl, etc.,
   k. alkyl substituted with an acyl group having the formula

wherein $R_{10}$ is hydroxy, hydrogen, aryl, e.g., phenyl, naphthyl, etc., lower alkyl having one to about eight carbon atoms e.g., methyl, ethyl, propyl, etc., amino including substituted amino, e.g., diloweralkylamino, lower alkoxy having one to about eight carbon atoms e.g., butoxy, methoxy, etc., aryloxy, e.g., phenoxy, naphthoxy, etc.;

1. alkyl acetates e.g., methyl acetate, ethyl acetate, etc.;

2. an aryl group, e.g., phenyl, naphthyl, anthryl, fluorenyl, etc., including a substituted aryl group such as
   a. alkoxyaryl, e.g., ethoxyphenyl, methoxyphenyl, propoxynaphthyl,
   b. aryloxyaryl, e.g., phenoxyphenyl, naphthoxyphenyl, phenoxynaphthyl, etc.
   c. aminoaryl, e.g., aminophenyl, aminonaphthyl, aminoanthryl, etc.,
   d. hydroxyaryl, e.g., hydroxyphenyl, hydroxynaphthyl, hydroxyanthryl, etc.,
   e. biphenylyl,
   f. alkylaminoaryl, e.g., methylaminophenyl, methylaminonaphthyl, etc. and also including dialkylaminoaryl, e.g., diethylaminophenyl, dipropylaminophenyl, etc.,
   g. arylaminoaryl, e.g., phenylaminophenyl, diphenylaminophenyl, N-phenyl-N-ethylaminophenyl naphthylaminophenyl, etc.,
   h. nitroaryl e.g., nitrophenyl, nitronaphthyl, nitroanthryl, etc.,
   i. cyanoaryl, e.g., cyanophenyl, cyanonaphthyl, cyanoanthryl, etc.,
   j. haloaryl, e.g., chlorophenyl, bromophenyl; chloronaphthyl, etc.,
   k. aryl substituted with an acyl group having the formula

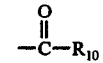

wherein $R_{10}$ is hydroxy, hydrogen, aryl, e.g., phenyl, naphthyl, etc., amino including substituted amino, e.g., diloweralkylamino, lower alkoxy having one to about eight carbon atoms, e.g., butoxy, methoxy, etc., aryloxy, e.g., phenoxy, naphthoxy, etc., lower alkyl havine one to about eight carbon atoms, e.g., methyl, ethyl, propyl, butyl, etc., 1. alkaryl, e.g., tolyl, ethylphenyl, propyl, naphthyl, etc.;

Minimum and maximum values for n are determined by solubility factors. When the molecular weight is too low, i.e., a value of n below about 2, the sensitizer will tend to diffuse into adjacent layers resulting in a decrease in the efficiency of front exposures. When the molecular weight of the polymeric sensitizer is too high, then it will be difficult to incorporate said sensitizer in sufficient amounts into the aggregate photoconductive layer.

While some of the compounds of the present invention possess some photoconductive properties, the use in multiactive elements in which the aggregate particles are absent results in exceptionally reduced blue sensitivity. It appears that such compounds interact in some manner with the aggregate particle and the photoconductors from the adjacent layer to produce multi-active elements having increased sensitivity.

Typically compounds included within Formula I are set out in Table I.

TABLE I

Compound:

1. 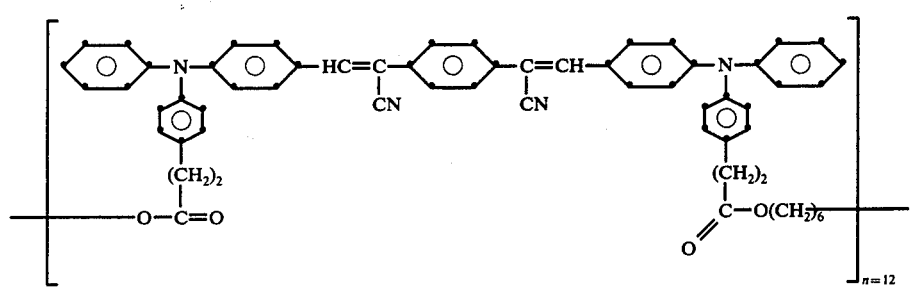

2. 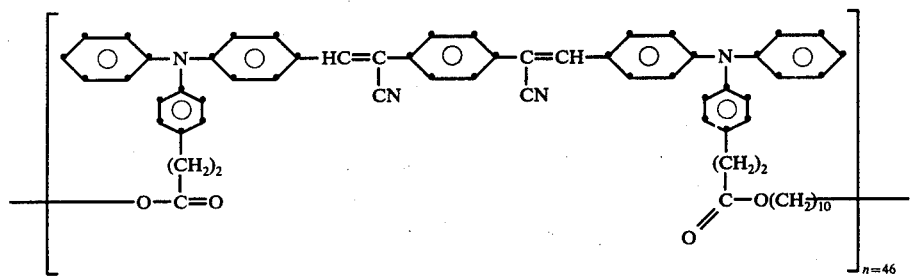

3. 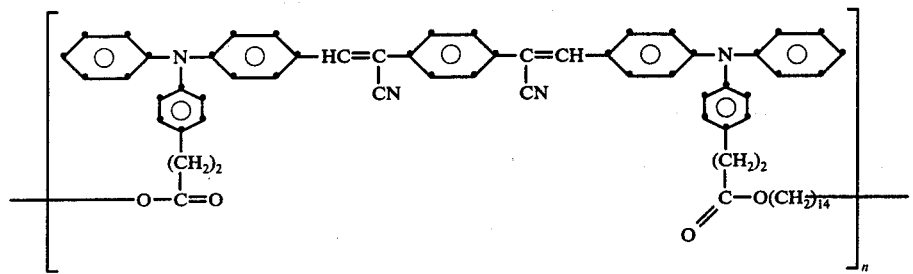

4. 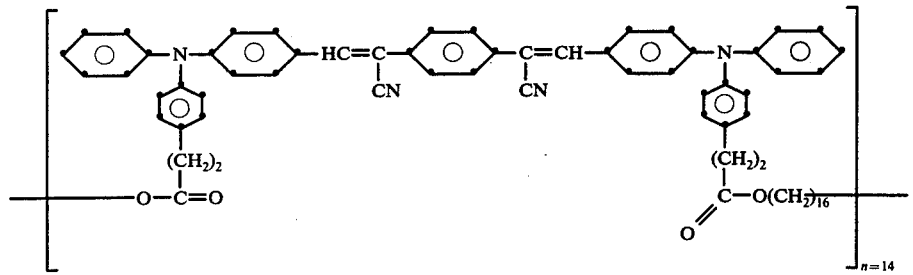

5. 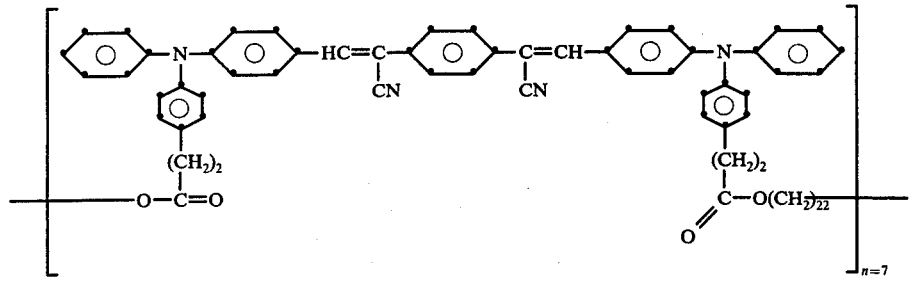

TABLE I-continued
Compound:
6.
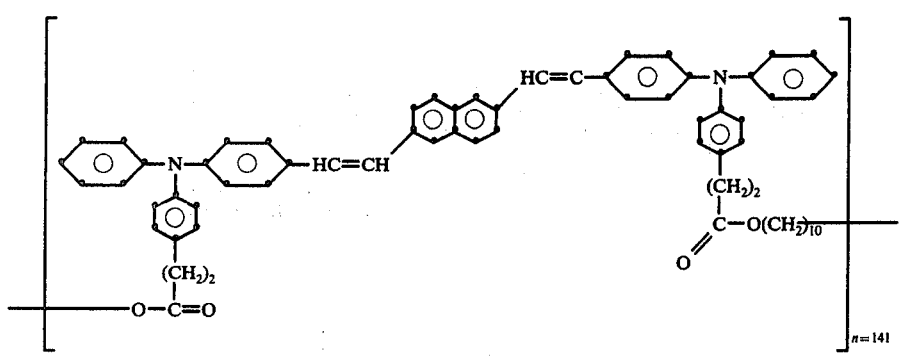
7.
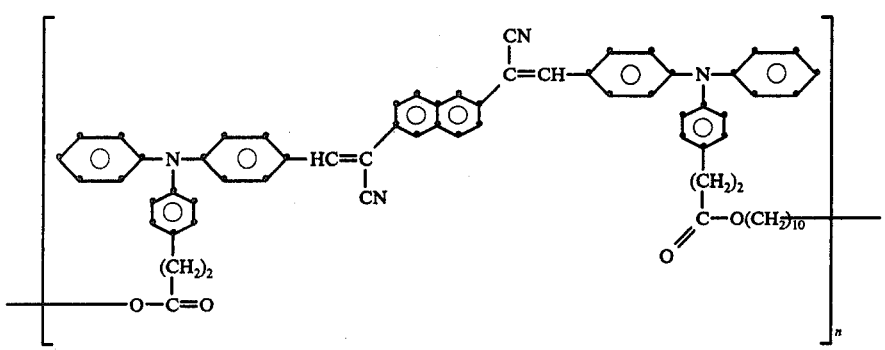
8.
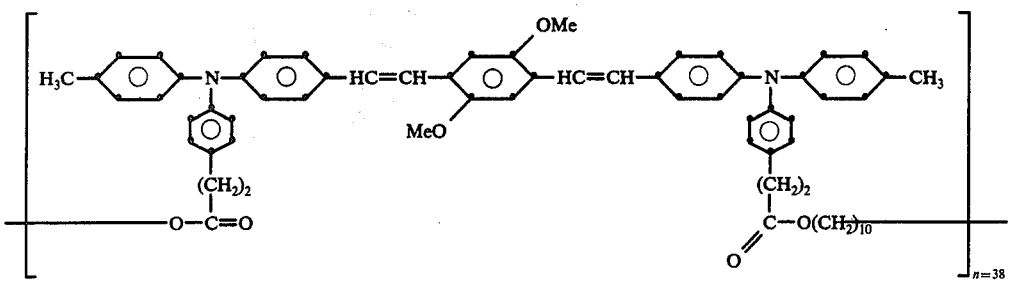
9.
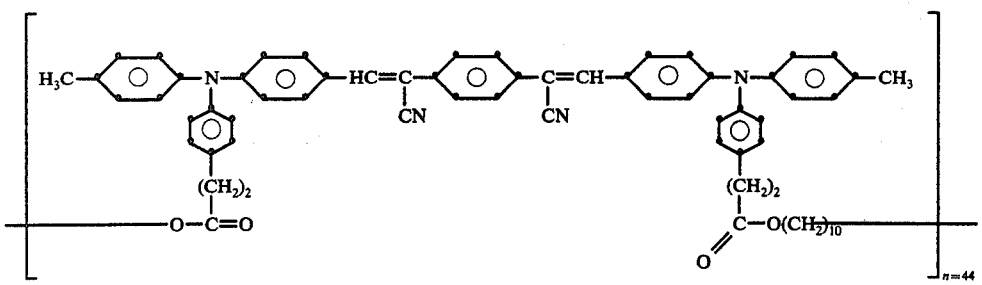
10.
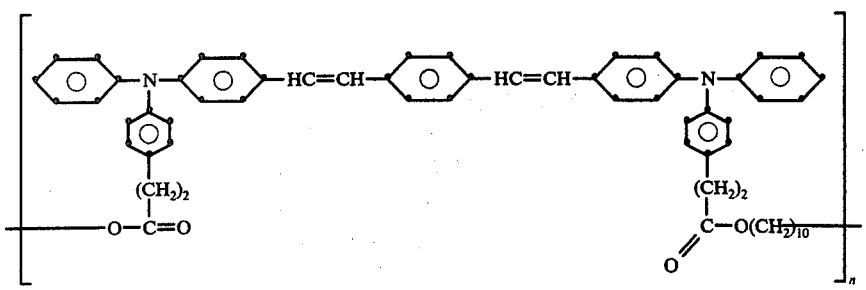

TABLE I-continued
Compound:
11. 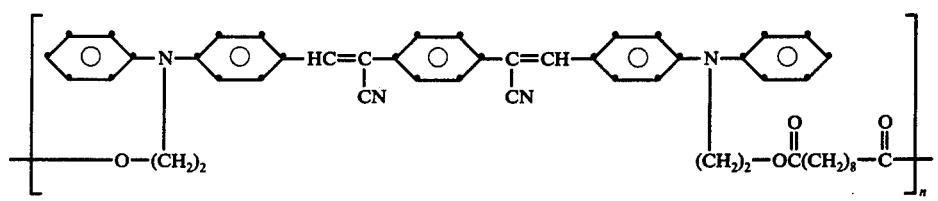
12. 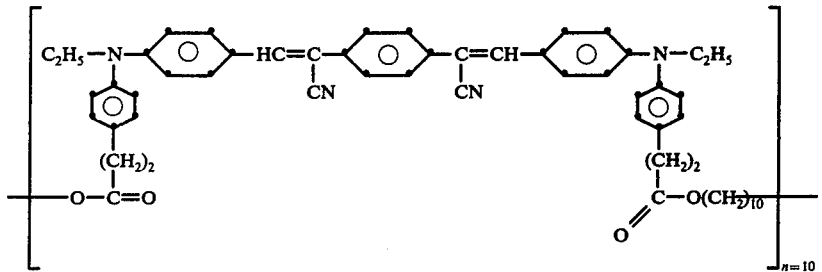
13. 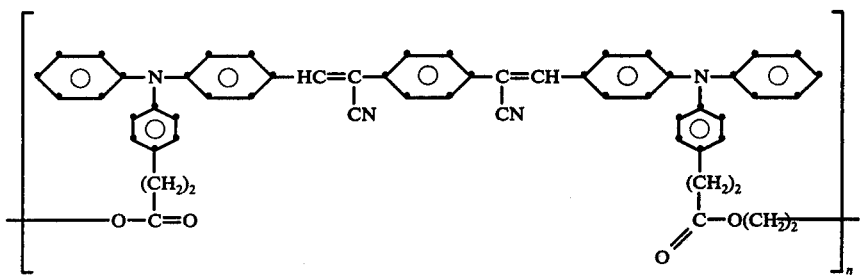
14. 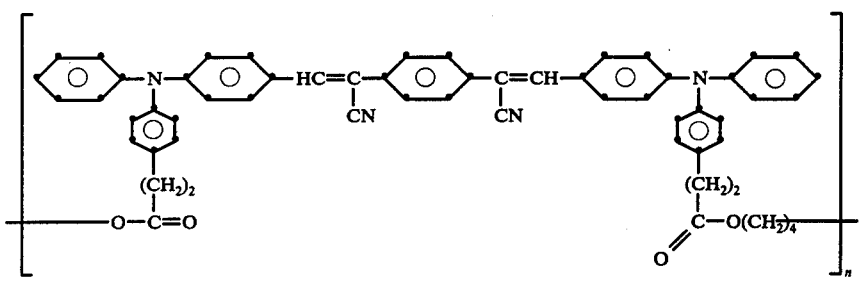
15. 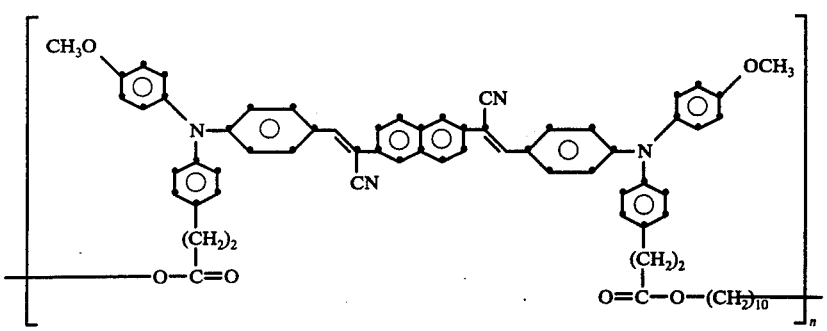

TABLE I-continued

Compound:

16.
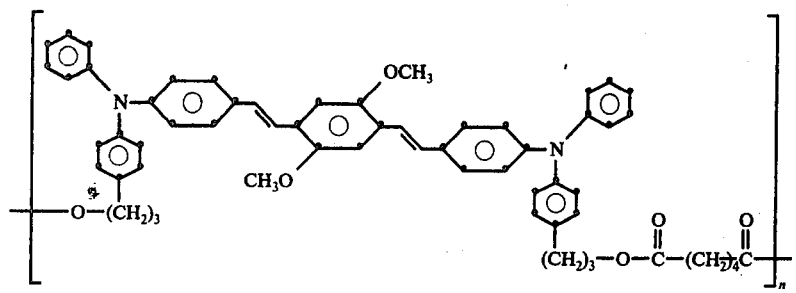

17.
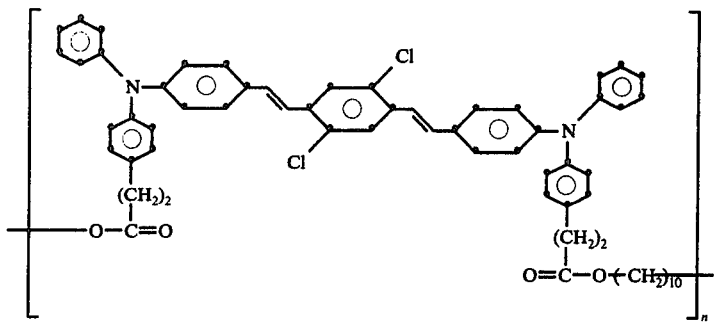

18.
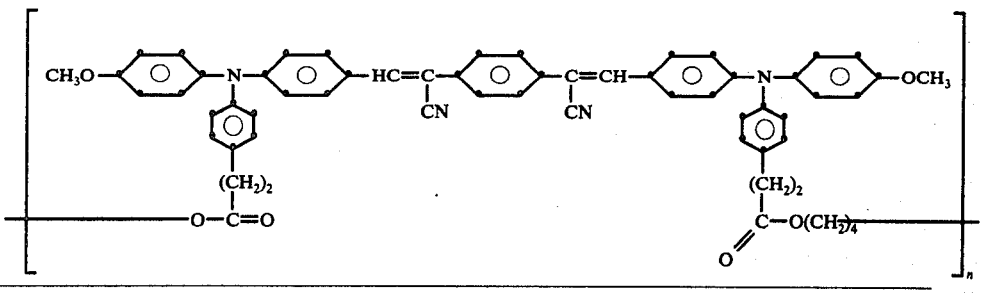

The polymeric compounds of the present invention may be prepared by generally known methods such as disclosed in Fieser and Fieser, *Advanced Organic Chemistry*, H. O. House, *Modern Synthetic Reactions* and numerous review articles such as J. Boutagy and R. Thomas, *Chemical Review*, 74, 89 (1974). For illustration purposes, Compound 1, Table I, is prepared as follows:

Preparation of 4-Formyl-4'-(β-methoxycarbonylethyl) triphenylamine

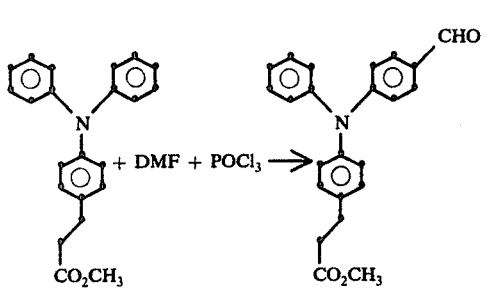

To a solution of 42 g (0.126 mole) of 4-(β-methoxycarbonylethyl)triphenylamine in 125 ml of dimethylformamide (DMF) heated to about 75° under nitrogen was added dropwise 22.2 g (0.145 mole) of phosphoryl chloride. The rate of addition was controlled so that the temperature of the reaction did not exceed 85°. Heating and stirring were continued for an additional 6 hours. The reaction mixture was allowed to cool and poured into 1 liter of saturated sodium acetate solution. The aqueous solution was extracted with several portions of benzene. The organic extracts were dried, filtered and the solvent removed. The tan oil was chromatographed on a column of silica gel.

Preparation of Dimethyl Ester

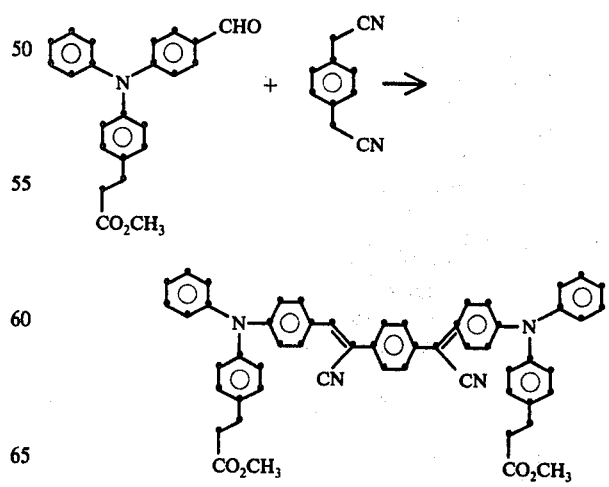

A mixture of 10.2 g (0.028 mole) of 4-formyl-4'-(β-methoxycarbonylethyl)triphenylamine, benzene diacetonitrile, 40 ml dimethylformamide, 250 ml methanol and 0.350 g of sodium methoxide was heated under nitrogen at 50° for 48 hours. The reaction mixture was allowed to cool and filtered. The orange cake was recrystallized two times from ethyl acetate-methanol, mp 167°–169°.

Preparation of Polyester

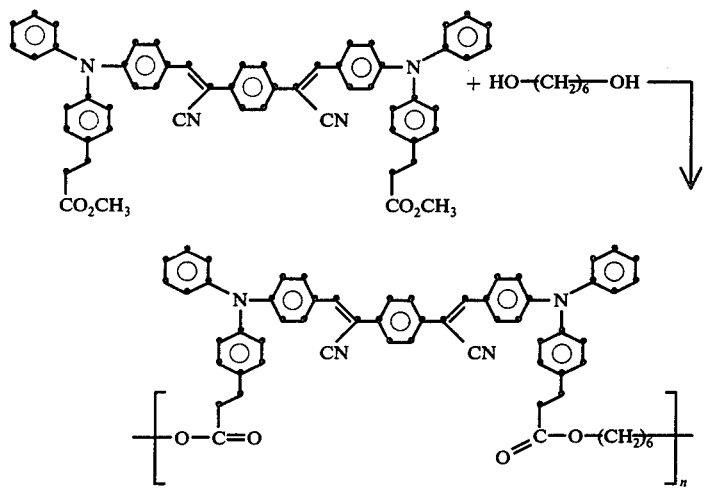

The compounds thus prepared are, in general, useful in any multi-active photoconductive insulating element in which an aggregate photoconductive layer is used.

The multi-active photoconductive elements of the present invention are formed, according to one mode of operation, by coating the aggregate photoconductive layer onto a suitable support and then overcoating the aggregate photoconductive layer with the photoconductor-containing layer. In another mode of operation, the photoconductor-containing layer may be coated onto a suitable support and then overcoating the photoconductor-containing layer with the aggregate photoconductive layer. Optionally, protective overcoats, interlayers and subbing layers may be used.

When the multi-active photoconductive element of this invention comprises an inorganic photoconductor containing layer in electrical contact with an aggregate photoconductive layer both layers may generate charge carriers, i.e., holes, or electrons, and inject them into the other layer, which, in turn, can transport these injected charge carriers. That is, the aggregate photoconductive layer can transport charge carriers, for example, electrons injected into it from a selenium-containing or zinc oxide-containing inorganic photoconductive layer; and the aggregate photoconductive layer can, in turn, generate its own charge carriers and inject them into the selenium-containing or zinc oxide-containing inorganic photoconductive layer. This is particularly true for selenium-containing and zinc oxide-containing layers. However, some inorganic photoconductive materials inject charge carriers into the aggregate photoconductive layer or they accept and transport charge carriers generated from within the aggregate photoconductive composition less efficiently than selenium containing or zinc containing layers. Accordingly, one can combine the aggregate photoconductive composition used in the present invention with a variety of different inorganic photoconductive compositions and achieve some improvement in photosensitivity. However, only a few of these compositions achieve the excellent photoelectrical results achieved with selenium-containing and zinc oxide containing layers.

The inorganic photoconductor-containing layer contains as an essential component an inorganic photoconductor. The term "inorganic photoconductor" as used herein is defined as any inorganic photoconductive element or compound, including inorganic polymers, consisting solely of inorganic molecules. A partial list of particularly useful photoconductors useful in the invention includes selenium containing or zinc-oxide containing inorganic photoconductive materials, the various structural forms of selenium such as metallic selenium and amorphous selenium, cadmium selenide, arsenic triselenide, and the like.

The inorganic photoconductor-containing layer used in the present invention may be composed solely of an inorganic photoconductor, such as a vacuum evaporated selenium layer (with or without various known sensitizer(s) or dopant(s) for the selenium-containing layer), or it may be composed of a mixture of inorganic photoconductors in an electrically insulating materials. The total amount of inorganic photoconductor employed together with an electrically insulating binder material, when one is used, may vary considerably. Typically, the amount of inorganic photoconductor(s) used in admixture with an electrically insulating binder varies within the range of from about 5 to about 99 percent by weight, preferably 50 to about 90 weight percent, based on the total weight of the inorganic photoconductor-containing layer.

A partial listing of representative materials which may be employed as binders in the inorganic photoconductor-containing layer are film-forming polymeric materials having a fairly high dielectric strength and good electrically insulating properties. Such binders include styrene-butadiene copolymers; polyvinyl toluene-styrene copolymers; styrene-alkyd resins; silicone-alkyd resins; soya-alkyd resins; vinylidene chloride-vinyl chloride copolymers; poly(vinylidene chloride); vinylidene chloride-acrylonitrile copolymers; vinyl acetate-vinyl chloride copolymers; poly(vinyl acetals), such as poly(vinyl butyral); nitrated polystyrene; polymethylstyrene, isobutylene polymers; polyesters, such as poly[ethylene-coalkylenebis(alkyleneoxyaryl) phenylenedicarboxylate]; phenolformaldehyde resins; ketone resins; polyamides; polycarbonates; polythiocarbonates; poly[ethylene-co-isopropylidene-2,2-bis-(ethyleneoxyphenylene)terephthalate]; copolymers of vinyl haloarylates and vinyl acetate such as poly(vinyl-m-bromobenzoate-co-vinyl acetate); chlorinated poly(olefins) such as chlorinated poly(ethylene); etc. Methods of making resins of this type have been described in the prior art, for example, sold under such tradenames as VITEL PE-101, CYMAC, Piccopale 100, Saran F-220, and LEXAN 145. Other types of binders which can be used in the inorganic photoconductor-containing layers include such material as paraffin, mineral waxes, etc., as well as combinations of binder materials.

The inorganic photoconductor-containing layer may also contain, if necessary or desirable depending on the particular inorganic photoconductors(s) selected and the specific spectral and electrical speed response desired, an effective amount of one or more sensitizers or dopants thiapyrylium dye salts and selenapyrylium dye salts disclosed in VanAllan et al U.S. Pat. No. 3,250,615; fluorenes, such as 7,12-dioxo-13-dibenzo(a,h)fluorene, 5,10-dioxo-4a,11-diazobenzo(b)fluorene, 3,13-dioxo-7-oxadibenzo(b,g)fluorene, and the like; aromatic nitro compounds of the kinds described in U.S. Pat. No. 2,610,120; anthrones like those disclosed in U.S. Pat. No. 2,670,284; quinones, U.S. Pat. No. 2,670,286; benzophenones U.S. Pat. No. 2,670,287; thiazoles, U.S. Pat. No. 2,732,301; mineral acids; carboxylic acids, such as maleic acid, dichloroacetic acid, trichloroacetic acid, and salicyclic acid, sulfonic and phosphoric acids, and various dyes, such as cyanine (including carbocyanine), merocyanine, diarylmethane, thiazine, azine, oxazine, xanthene, phthalein, acridine, azo, anthraquinone dyes and the like and mixtures thereof.

Where a sensitizing compound is employed in the inorganic photoconductor-containing layer, it is the normal practice, when the inorganic photoconductor-containing layer is applied as a liquid coating dope, to mix a suitable amount of the sensitizing compound with the coating composition so that, after thorough mixing, the sensitizing compound is uniformly distributed in the coated layer. In general, useful results can be obtained where an appropriate sensitizer is added in a concentration range from about 0.001 to about 30 percent by weight based on the dry weight of the inorganic photoconductor-containing layer. Normally, when used, a sensitizer is added to the layer in an amount by weight from about 0.005 to about 10.0 percent by weight of the layer.

The inorganic photoconductor-containing layer may also contain other addenda such as leveling agents, surfactants, plasticizers and the like to enhance or improve various physical properties of the layer.

Liquid coating vehicles useful for coating inorganic photoconductor-containing layers (which include a binder) onto a suitable substrate can include a wide variety of aqueous and organic vehicles. Typical organic coating vehicles include:

(1) Aromatic hydrocarbons such as benzene, naphthalene, etc., including substituted aromatic hydrocarbons such as toluene, xylene, mesitylene, etc.;

(2) Ketones such as acetone; 2butanone, etc.;

(3) Halogenated aliphatic hydrocarbons such as methylene chloride, chloroform, ethylene chloride, etc.;

(4) Ethers including cyclic ethers such as tetrahydrofuran, ethylether;

When the multi-active photoconductive element of the present invention comprises an organic photoconductor-containing layer in electrical contact with an aggregate photoconductive layer, the organic photoconductor-containing layer functions as a charge transport layer and the aggregate photoconductive layer functions as a charge generation layer. The term "organic", as used herein, refers to both organic and metallo-organic materials.

The organic-photoconductor containing layer contains as the active charge-transport material one or more organic photoconductors capable of accepting and transporting charge carriers generated by the aggregate photoconductive layer. Useful organic photoconductors can generally be divided into two classes depending upon the electronic charge-transport properties of the material. That is most charge-transport materials generally will preferentially accept and transport either positive charges, i.e. holes (p-type charge transport materials), or negative charges, i.e. electrons (n-type charge transport materials), generated by the charge-generation layer. Of course, there are materials (amphoteric) which will accept and transport either positive charges or negative charges.

The capability of a given organic photoconductor to accept and transport charge carriers generated by the aggregate photoconductive layer can be conveniently determined by coating a layer of the particular organic photoconductor under consideration for use as a charge-transport material (e.g. a 5 to 10 micron thick layer containing about 30 weight percent or more of the organic photoconductive material together with up to about 70 weight percent of a binder, if one is used), on the surface of an aggregate photoconductive layer (e.g., a 0.5 to 2 micron aggregate photoconductive layer) which is, in turn, coated on a conducting substrate. The resultant unitary element may then be subjected to a conventional electrophotographic processing sequence including (a) applying a uniform electrostatic charge to the surface of the layer to be tested for charge-transport properties in the absence of activating radiation while the conducting substrate is maintained at a suitable reference potential thereby creating a potential difference, $V_o$, across the element of, for example, about ± 200–600 volts, (b) exposing the aggregate photoconductive layer of the resultant element to activating radiation, for example, 680 nm light energy and (c) determining the change in the magnitude of the charge initially applied to the element caused by the exposure to activating radiation, i.e., calculating the change in potential difference, $\Delta.V$, across the element as a result of the exposure. If the particular organic photoconductor under consideration as a charge-transport material possesses no charge-transport capability, then the ratio of the quantity $V_o$ to the quantity $V_o - \Delta V$, i.e., the ratio $V_o : (V_o - \Delta V)$, will, to the good approximation, equal the ratio of the sum of the physical thicknesses of the charge-transport layer, $T_{ct}$, and the aggregate photoconductive layer, $T_{cg}$, to the physical thickness of the charge-generation layer by itself (i.e. $T_{cg}$), i.e., the ratio $(T_{ct} + T_{cg}) : T_{cg}$. That is, $V_o : (V_o - \Delta V) \approx (T_{ct} + T_{cg}) : T_{cg}$. If, on the other hand, the particular organic photoconductor under consideration possesses charge-transport capability then the ratio $V_o : (V_o - \Delta V)$ will be greater than the ratio $(T_{ct} + T_{cg}) : T_{cg}$, i.e., $V_o : (V_o \Delta V) (T_{ct} + T_{cg}) : T_{cg}$. If, as is often the case, a binder is employed in the charge-transport layer when the above-described charge-transfer determination is made, care should be taken to account for any charge-transport capability which may be imparted by the binder.

The organic photoconductors preferred for use as a charge-transport material in the charge transport layer do not, in fact, function as photoconductors in the present invention because such materials are insensitive to visible light, and therefore, do not generate electron-hole pairs upon exposure to visible light; rather, these materials serve to transport the charge carriers generated by the aggregate photo-conductive layer. A partial listing of representative p-type organic photoconductive materials encompasses:

1. carbazole materials including carbazole, N-ethyl carbazole, N-isopropyl carbazole, N-phenylcarbazole, halogenated carbazoles, various polymeric carbazole materials such as poly(vinyl carbazole) halogenated poly(vinyl carbazole), and the like.

2. arylamine-containing materials including monoarylamines, diarylamines, triarylamines, as well as polymeric arylamines. A partial listing of specific arylamine organic photoconductors include the particular non-polymeric triphenylamines illustrated in Klupfel et al., U.S. Pat. No. 3,180,730 issued Apr. 27, 1965; the polymeric triarylamines described in Fox U.S. Pat. No. 3,240,597 issued Mar. 15, 1966; the triarylamines having at least one of the aryl radicals substituted by either a vinyl radical or a vinylene radical having at least one active hydrogen-containing group as described in Brantly et al., U.S. Pat. No. 3,567,450 issued Mar. 2, 1971; the triarylamines in which at least one of the aryl radicals is substituted by an active hydrogen-containing group as described in Brantly et. al. U.S. Pat. No. 3,658,520 issued Apr. 25, 1972; and tritolylamine.

3. polyarylalkane materials of the type described in Noe et. al., U.S. Pat. No. 3,274,000 issued Sept. 20, 1966; Wilson; U.S. Pat. No. 3,542,547 issued Nov. 24, 1970; Seus et. al., U.S. Pat. No. 3,542,544 issued Nov. 24, 1970, and in Rule et. al., U.S. Pat. No. 3,615,402 issued Oct. 26, 1971. Preferred polyarylalkane photoconductors can be represented by the formula:

wherein D and G, which may be the same or different, represent aryl groups and J and E, which may be the same or different, represent a hydrogen atom, an alkyl group, or an aryl group, at least one of D, E and G containing an amino substituent. An especially useful polyarylalkane photoconductor which may be employed as the charge transport material is a polyarylalkane having the formula noted above wherein J and E represent a hydrogen atom, an aryl group; or an alkyl group and D and G represent substituted aryl groups having as a substituent thereof a group represented by the formula:

wherein R represents an unsubstituted aryl group such as phenyl or an alkyl substituted aryl such as a tolyl group. Additional information concerning certain of these latter polyarylalkane materials may be found in rule et al, copending U.S. patent application, Ser. No. 639,040, filed Dec. 9, 1975, a continuation-in-part of Rule et al., U.S. Ser. No. 534,953 filed Dec. 20, 1974.

4. strong Lewis base materials such as various aromatic including aromatically unsaturated heterocyclic-containing materials which are free to strong electron withdrawing groups. A partial listing of such aromatic Lewis base materials includes tetraphenylpyrene, 1-methylpyrene, perylene, chrysene, anthracene, tetraphene, 2-phenyl naphthalene, azapyrene, fluorene, fluorenone, 1-ethylpyrene, acetyl pyrene, 2,3-benzochrysene, 3,4-benzopyrene, 1,4-bromopyrene, and phenylindole, polyvinyl carbazole, polyvinyl pyrene, polyvinyl tetracene, polyvinyl perylene, and polyvinyl tetraphene.

5. other useful p-type charge-transport materials which may be employed in the present invention are any of the p-type organic photoconductors, including metalloorgano materials, known to be useful in electrophotographic processes, such as any of the organic photoconductive materials described in Research Disclosure, Vol. 109, May 1973, pages 61–67, paragraph IV (A) (2) through (13) which are p-type photoconductors.

Representative of typical n-type charge-transport materials which are believed to be useful are strong Lewis acids such as organic, including metallo-organic, materials containing one or more aromatic, including aromatically unsaturated heterocyclic, materials bearing an electron withdrawing substituent. These materials are considered useful because of their characteristic electron accepting capability. Typical electron withdrawing substituents include cyano and nitro groups; sulfonate groups; halogens such as chlorine, bromine, and iodine; ketone groups; ester groups; acid anhydride groups; and other acid groups such as carboxyl and quinone groups. A partial listing of such representative n-type aromatic Lewis acid materials having electron withdrawing substituents include phthalic anhydride, tetrachlorophthalic anhydride, benzil, mellitic anhydride, S-tricyanobenzene, picryl chloride, 2,4-dinitrochlorobenzene, 2,4-dinitrobromobenzene, 4-nitrobiphenyl, 4,4-dinitrobiphenyl, 2,4,6-trinitroanisole, trichlorotrinitrobenzene, trinitro-O-toluene, 4,6-dichloro-1,3-dinitrobenzene, 4,6-dibromo-1,3-dinitrobenzene, P-dinitrobenzene, chloranil, bromanil, 2,4,7-trinitro-9-fluorenone, 2,4,5,7-tetranitrofluorenone, trinitroanthracene, dinitroacridene, tetracyanopyrene, dinitroanthraquinone, and mixtures thereof.

Other useful n-type charge-transport materials which may be employed in the present invention are conventional n-type organic photoconductors, for example, complexes of 2,4,6-trinitro-9-fluorenone and poly(vinyl carbazole) provide useful n-type charge-transport materials. Still other n-type organic, including metalloorgano, photoconductive materials useful as n-type charge-transport materials in the present invention are any of the organic photoconductive materials known to be useful in electrophotographic processes such as any of the materials described in Research Disclosure, Vol. 109, May 1973, pages 61–67, paragraph IV (A) (2) through (13) which are n-type photoconductors. The foregoing Research Disclosure article is incorporated herein by reference thereto.

The organic photoconductor-containing or charge-transport layer may consist entirely of the organic photoconductors described hereinabove, or, as is more usually the case, the organic photoconductor-containing layer may contain a mixture of the organic photoconductors in a suitable film-forming polymeric binder material. The binder material may, if it is an electrically insulating material, help to provide the charge-transport layer with electrical insulating organic photoconductor-containing characteristics, and it also serves as a film-forming material useful in (a) coating the organic photoconductor containing layer, (b) adhering the organic photoconductor-containing layer to an adjacent substrate, and (c) providing a smooth, easy to clean, and wear resistant surface. Of course, in instances where the organic photoconductor may be conveniently applied without a separate binder, for example, where the organic photoconductor-containing material is itself a polymeric material, such as a polymeric arylamine or poly(vinyl carbazole), there may be no need to use a separate polymeric binder. However, even in many of these cases, the use of a polymeric binder may enhance desirable physical properties such as adhesion, resistance to cracking, etc.

Where a polymeric binder material is employed in the organic photoconductor-containing layer, the optimum ratio of charge-transport material to binder material may vary widely depending on the particular polymeric binder(s) and particular organic photoconductor(s) used. In general, it has been found that, when a binder material is used, useful results are obtained wherein the amount of active organic photoconductor contained within the organic photoconductor-containing layer varies within the range of from about 5 to about 90 weight percent based on the dry weight of the charge-transport layer.

A partial listing of representative materials which may be employed as binders in the organic photoconductor-containing layer are film-forming polymeric materials having a fairly high dielectric strength and good electrically insulating properties. Such binders include styrene-butadiene copolymers; polyvinyl toluenestyrene copolymers; styrene-alkyd resins; silicone-alkyd resins; soya-alkyd resins; vinylidene chloride-vinyl chloride copolymers; poly(vinylidene chloride); vinylidene chloride-acrylonitrile copolymers; vinyl acetate-vinyl chloride copolymers; poly(vinyl acetals), such as poly(vinyl butyral); nitrated polystyrene; polymethylstyrene; isobutylene polymers; polyesters, such as poly[ethylene-co-alkylenebis(alkyleneoxyaryl) phenylenedicarboxylate]; phenolformaldehyde resins; ketone resins; polyamides; polycarbonates, polythiocarbonates; poly[ethyleneco-isopropylidene-2,2-bis(ethyleneoxyphenyleneterephthalate]; copolymers of vinyl haloarylates and vinyl acetate such as poly(vinyl-m-bromobenzoate-co-vinyl acetate); chlorinated poly-(olefins), such as chlorinated poly(ethylene); etc. Suitable resins of the type contemplates for use in the charge transport layers of the invention are sold under such tradenames as VITEL PE-101, CYMAC, Piccopale 100, Saran F-220, and LEXAN 145. Other types of binders which can be used in charge transport layers include such materials as paraffin, mineral waxes, etc., as well as combinations of binder materials.

In general, it has been found that polymers containing aromatic or heterocyclic groups are most effective as the binder materials for use in the organic photoconductor-containing layers because these polymers, by virtue of their heterocyclic or aromatic groups, tend to provide little or no interference with the transport of charge carriers through the layer. Heterocyclic or aromatic-containing polymers which are especially useful in p-type organic photoconductor-containing layers include styrene-containing polymers, bisphenol-A polycarbonate polymers, phenol-formaldehyde resins, polyesters such as poly[ethyleneco-isopropylidene-2,2-bis(ethyleneoxyphenylene)]terephthalate, and copolymers of vinyl haloarylates and vinylacetate such as poly(vinyl-m-bromobenzoate-co-vinyl acetate).

The organic photoconductor-containing layer may also contain other addenda such as leveling agents, surfactants, plasticizers, and the like to enhance or improve various physical properties of the charge-transport layer. In addition, various addenda to modify the electrophotographic response of the element may be incorporated in the organic photoconductor layer. For example, various contrast control materials, such as certain hole-trapping agents and certain easily oxidized dyes may be incorporated in the charge-transport layer. Various such contrast control materials are described in *Research Disclosure*, Volume 122, June 1974, p. 33, in an article entitled "Additives for Contrast Control in Organic Photoconductor Compositions and Elements".

The thickness of the organic photoconductor-containing layer may vary. It is especially advantageous to use an organic photoconductor-containing layer which is thicker than that of the aggregate photoconductive layer, with best results generally being obtained when the organic photoconductor layer is from about 5 to about 200 times, and particularly 10 to 40 times, as thick as the aggregate photoconductive layer. A useful thickness for the aggregate photoconductive layer is within the range of from about 0.1 to about 15 microns dry thickness, particularly from about 0.5 to about 2 microns. However, good results can also be obtained using an organic photoconductor-containing layer which is thinner than the aggregate photoconductive-layer.

The organic photoconductor-containing layers described herein are typically applied to the desired substrate by coating a liquid dispersion or solution containing the organic photoconductor-containing layer components. Typically, the liquid coating vehicle used is an organic vehicle. Typical organic coating vehicles include:

(1) Aromatic hydrocarbons such as benzene, naphthalene, etc., including substituted aromatic hydrocarbons such as toluene, xylene, mesitylene, etc.;

(2) Ketones such as acetone, 2-butanone, etc.;

(3) Halogenated aliphatic hydrocarbons such as methylene chloride, chloroform, ethylene chloride, etc.;

(4) Ethers including cyclic ethers such as tetrahydrofuran, ethylether;

(5) Mixtures of the above.

The aggregate photoconductive layer used in the present invention may comprise an aggregate composition as described in Light, U.S. Pat. No. 3,615,414 issued Oct. 26, 1971. These aggregate compositions have a multiphase structure comprising (a) a discontinuous phase of at least one particulate co-crystalline compound or complex of a pyrylium-type dye salt and an electrically insulating, film-forming polymeric material containing an alkylidene diarylene group as a recurring unit and (b) a continuous phase comprising an electrically insulating film-forming polymeric material. Optionally, one or more charge-transport material(s) may also be incorporated in this multiphase structure. Of course, these multi-phase compositions may also contain other addenda such as leveling agents, surfactants, plasticizers, contrast control materials and the like to enhance or improve various physical properties or electrophotographic response characteristics of the charge-generation layer.

The aggregate composition may be prepared by several techniques, such as, for example, the so-called "dye first" technique described in Gramza et al., U.S. Pat. No. 3,615,396 issued Oct. 26, 1971. Alternatively, these compositions may be prepared by the so-called "shearing" method described in Gramza, U.S. Pat. No. 3,615,415 issued Oct. 26, 1971. Still another method of preparation involves performing the finely-divided aggregate particles such as is described in Gramza et al., U.S. Pat. No. 3,732,180 and simply storing these preformed aggregate particles until it is desired to prepare the charge-generating layer. At this time, the preformed aggregate particles may be dispersed in an appropriate coating vehicle together with the desired film-forming polymeric material and coated on a suitable substrate to form the resultant aggregate charge-generation composition.

In any case, by whatever method prepared, the aggregate composition, containing compounds according to Formula I, exhibits a separately identifiable multi-phase structure. The aggregate nature of this multi-phase composition is generally apparent when viewed under at least 2500X magnification, although such compositions may appear to be substantially optically clear to the naked eye in the absence of magnification. There can, of course, be microscopic heterogeneity. Suitably, the co-crystalline complex particles present in the continuous phase of the aggregate composition are finely-divided, that is, typically predominantly in the size range of from about 0.01 to about 25 microns.

The terms "co-crystalline complex" or "co-crystalline compound" are used interchangeably herein and have reference to a co-crystalline compound which contains dye and polymer molecules co-crystallized in a single crystalline structure to form a regular array of molecules in a three-dimensional pattern. It is this particulate co-crystalline material dispersed in the continuous polymer phase of the aggregate photoconductive layer which, upon being exposed to activating radiation in the presence of an electric field, generates and/or transports electron-hole pairs in the multi-active photoconductive elements of the present invention.

Another feature characteristic of conventional heterogeneous or aggregate compositions such as those described in U.S. Pat. Nos. 3,615,414 and 3,732,180, is that the wavelength of the radiation absorption maximum characteristic of such compositions is substantially shifted from the wavelength of the radiation absorption maximum of a substantially homogeneous dye-polymer solid solution formed of similar constituents. The new absorption maximum characteristic of the aggregate composition is now necessarily an overall maximum for the system as this will depend on the relative amount of dye in the aggregate. The shift in absorption maximum which occurs due to the formation of the co-crystalline complex in conventional aggregate compositions is generally of the magnitude of at least about 10 nanometers.

The pyrylium-type dye salts useful in preparing the co-crystalline complex contained in the charge-generation layer of the present invention includes pyrylium, bispyrylium, thiapyrylium, and selenapyrylium dye salts; and also salts of pyrylium compounds containing condensed ring systems such as salts of benzopyrylium and napthopyrylium dyes are useful in forming such compositions. Typical pyrylium-type dye salts from these classes which are useful in forming these co-crystalline complexes are disclosed in Light, U.S. Pat. No. 3,615,414 noted above.

The film-forming polymer used in forming the co-crystalline complex contained in the charge-generation layer used in the present invention may include any of a variety of film-forming polymeric materials which are electrically insulating and have an alkylidene diarylene group in a recurring unit such as those disclosed in Light, U.S. Pat. No. 3,615,414.

The amount of the above-described pyrylium type dye salt used in forming the aggregate photoconductive layer may vary. Useful results are obtained by employing the described pyrylium-type dye salts in amounts of from about 0.001 to about 50 percent based on the dry weight of the aggregate photoconductive-layer.

The amount of dialkylidene diarylene group-containing polymer used in the charge-generation layer of the multi-active elements of the invention may vary. Typically, the aggregate photoconductive layer contains an amount of this polymer within the range of from about 20 to about 98 weight percent based on the dry weight of the charge-generation layer, although larger or smaller amounts may also be used.

The amount of compound represented by Formula I included in the aggregate photoconductive layer may vary widely. In general amounts from about 0.1% by weight to about 50% by weight of the dried layer is effective although amounts outside of this range will work. However, amounts of about 5% by weight to about 20% by weight are preferred.

Optionally, one or more organic photoconductors may be incorporated into the aggregate composition. Organic photoconductors including metallo-organic, materials which can be solubilized in the continuous phase of the aggregate composition may be used.

If an organic photoconductor is incorporated in the aggregate photoconductive layer of the multi-active element of the invention as is described above, the particular material selected should be electronically compatible with the organic photoconductor used in the aggregate photoconductive layer. That is, if an n-type organic photoconductor is used in the organic photoconductor-containing layer, then an n-type should be incorporated in the aggregate photoconductive composition. Similarly, if a p-type organic photoconductor is used in the organic photoconductor-containing layer, then a p-type organic photoconductor should be incorporated in the aggregate photoconductive layer of the element.

The multi-active elements of the invention may be affixed, if desired, to a variety of electrically conducting supports, for example, paper (at a relative humidity above 20 percent); aluminum-paper laminates; metal foils such as aluminum foil, zinc foil, etc.; metal plates, such as aluminum, copper, zinc, brass and galvanized plates; vapor deposited metal layers such as silver, nickel, aluminum and the like coated on paper or conventional photographic film bases such as cellulose acetate, polystyrene, etc. Such conducting materials as nickel can be vacuum deposited on transparent film supports in sufficiently thin layers to allow electrophotographic elements prepared therewith to be exposed from either side of such elements. An especially useful conducting support can be prepared by coating a support material such as poly(ethylene terephthalate with a conducting layer containing a semiconductor dispersed in a resin or vacuum deposited on the support. Such conducting layers both with and without insulating barrier layers are described in U.S. Pat. No. 3,245,833 by Trevoy, issued Apr. 12, 1966. Other useful conducting layers include compositions consisting essentially of an intimate mixture of at least one protective inorganic oxide and from about 30 to about 70 percent by weight of at least one conducting metal, e.g., a vacuum-deposited cermet conducting layer as described in Rasch, U.S. Pat. No. 3,880,657 issued Apr. 29, 1975. Likewise, a suitable conducting coating can be prepared from the sodium salt of a carboxyester lactone of maleic anhydride and a vinyl acetate polymer. Such kinds of conducting layers and methods for their optimum preparation and use are disclosed in U.S. Pat. Nos. 3,007,901 by Minsk, issued Nov. 7, 1961 and 3,262,807 by Sterman et al., issued July 26, 1966.

The multi-layer photoconductive elements of the invention can be affixed, if desired, directly to a conducting substrate. In some cases, it may be desirable to use one or more intermediate subbing layers between the conducting substrate to improve adhesion to the conducting substrate and/or to act as an electrical barrier layer between the multi-active element and the conducting substrate as described in Dessauer, U.S. Pat. No. 2,940,348. Such subbing layers, if used, typically have a dry thickness in the range of about 0.1 to about 5 microns. Typical subbing layer materials which may be used include film-forming polymers such as cellulose nitrate, polyesters, copolymers or poly(vinyl pyrrolidone) and vinylacetate, and various vinylidene chloride-containing polymers including two, three and four component polymers prepared from a polymerizable blend of monomers or prepolymers containing at least 60 percent by weight of vinylidene chloride. A partial list of representative vinylidene chloride-containing polymersis includes vinylidene chloride-methyl methacrylate-itaconic acid terpolymers as disclosed in U.S. Pat. No. 3,143,421. Various vinylidene chloride containing hydrosol tetrapolymers which may be used include tetrapolymers of vinylidene chloride, methyl acrylate, acrylonitrile, and acrylic acid as disclosed in U.S. Pat. No. 3,640,708. A partial listing of other useful vinylidene chloride-containing copolymers includes poly(vinylidene chloride-methyl acrylate), poly(vinylidene chloride-methacrylonitrile), poly(vinylidene chloride-acrylonitrile), and poly(vinylidene chloride-acrylonitrile-methyl acrylate). Other useful subbing materials include the so-called tergels which are described in Nadeau et al., U.S. Pat. No. 3,501,301.

One especially useful subbing layer which may be employed in the multi-active element of the invention is a hydrophobic film-forming polymer or copolymer free from any acid-containing group, such as a carboxyl group, prepared from a blend of monomers or prepolymers, each of said monomers or prepolymers containing one or more polymerizable ethylenically unsaturated groups. A partial listing of such useful materials includes many of the above-mentioned copolymers, and, in addition, the following polymers: copolymers of polyvinylpyrrolidone and vinyl acetate, poly(vinylidene chloride-methyl methacrylate), and the like.

Optional overcoat layers may be used in the present invention, if desired. For example, to improve surface hardness and resistance to abrasion, the surface layer of the multi-active element of the invention may be coated with one or more electrically insulating, organic polymer coatings or electrically insulating, inorganic coatings. A number of such coatings are well known in the art and accordingly extended discussion thereof is unnecessary. Typical useful such overcoats are described, for example, in *Research Disclosure,* "Electrophotographic Elements, Materials, and Processes", Volume 109, page 63, Paragraph V, May, 1973, which is incorporated by reference herein.

The following examples are presented to further illustrate and clarify the invention:

General Method For Preparation of Multi-Active Elements

| | Base Aggregate Photoconductive Layer | |
|---|---|---|
| a. | Bisphenol-A-polycarbonate High Molecular Weight | 3.26 g |
| b. | 4-(4-dimethylaminophenyl)-2,6-diphenylthiapyrylium hexafluorophosphate | 1.59 g |
| c. | Dichloromethane | 171.6 g |
| d. | 1,1,2-Trichloroethane | 73.5 g |
| e. | Polymeric compound from Table I | 0.84 g |

The base aggregate layer was formulated and coated according to procedures substantially similar to those disclosed in Fox et al., U.S. Pat. No. 3,706,554 issued Dec. 19, 1972.

| | Carrier Transport Layer | |
|---|---|---|
| a. | Bisphenol-A-polycarbonate High Molecular Weight | 8.6 g |
| b. | Bisphenol-A-polycarbonate (Lexan 145, General Electric Co.) | 77.8 g |
| c. | Tri-p-tolylamine | 38.2 g |
| d. | 1,1-Bis(di-p-tolylaminophenyl) cyclohexane | 19.4 g |
| e. | Chloroform | 1056.0 g |

This formulation was prepared by first dissolving the two binder polymers in chloroform over a 2 hour period with a speed controlled, heavy duty, mechanical stirrer. The photoconductors were then added and stirred into solution for 30 minutes. The final solution was filtered and coated in two passes of 0.7 and 0.9 g/ft$^2$ onto the aggregate photoconductive layers to yield the completed multi-active photoconductive element.

EXAMPLES 1-12

Twelve different multi-active photoconductive elements were prepared along with the control according to the just described procedure. Each element contained a different polymeric sensitizer selected from Table I. Table II indicates the sensitivity of each element relative to the control element which included tri-p-tolylamine instead of a compound from Table I.

TABLE II

| Element | Compound from Table I | Relative Sensitivity* −460 nm |
|---|---|---|
| Control | ** | 1. |
| 1 | 1 | 4.2 |
| 2 | 2 | 7.4 |
| 3 | 3 | 4.5 |
| 4 | 4 | 4.5 |
| 5 | 5 | 3.9 |
| 6 | 6 | 5.5 |
| 7 | 7 | 4.1 |
| 8 | 8 | 6.7 |
| 9 | 9 | 7.3 |
| 10 | 10 | 7.4 |
| 11 | 11 | 5.4 |

TABLE II-continued

| Element | Compound from Table I | Relative Sensitivity* −460 nm |
|---------|----------------------|-------------------------------|
| 12      | 12                   | 4.9                           |

*Relative sensitivity represents the reciprocal of the relative energy required to discharge the multi-active photoconductive element from −500 volts to −100 volts residual potential as compared to the control element which is arbitrarily assigned a relative sensitivity value of 1.0. The listed values are for front exposures to 460 nm. light energy.
**Contains tri-p-tolylamine.

The relative sensitivity measurements reported in this and the following examples are relative reciprocal electrical sensitivity measurements. The relative reciprocal electrical sensitivity measures the speed of a given photoconductive element relative to other elements typically within the same test group of elements. The relative reciprocal sensitivity values are not absolute sensitivity values. However, relative reciprocal sensitivity values are related to absolute sensitivity values. The relative reciprocal electrical sensitivity is a dimensionless number and is obtained simply by arbitrarily assigning a value, Ro, to one particular absolute reciprocal sensitivity of one particular photoconductive control element. The relative reciprocal sensitivity Rn, of any other photoconductive element, $n$, relative to this value, Ro, may then be calculated as follows: $Rn = (A_n)(Ro/Ao)$ wherein An is the absolute reciprocal electrical sensitivity (in $cm^2$/ergs.) of n, Ro is the sensitivity value arbitrarily assigned to the control element, and Ao is the absolute reciprocal electrical sensitivity (measured in $cm^2$/ergs.) of the control element.

This data demonstrates that the polymeric sensitizers of the present invention result in a substantial increase in sensitivity of a multi-active photoconductive element compared to the control. Indeed, in some cases, the improvement was almost ten fold.

EXAMPLE 13

Two separate elements were prepared according to the general procedure. Element 1 contained an aggregate photoconductive layer containing Compound 1 from Table I. In the second element tri-p-tolylamine was used for a control. Electrophotograhic measurements showed that the sensitivity of element 1 was almost 10 times that of the control upon both front and rear exposure in the blue region of the spectrum. Moreover, element 1 demonstrated an enhanced sensitivity throughout a much greater area of the blue region than did the control and thus provided a more panchromatic element.

EXAMPLE 14

To demonstrate the synergistic increase in sensitivity of certain multi-active photoconductive elements of the invention, three separate elements were prepared according to the general procedure except for the differences indicated in the following Table III. The relative sensitivity of each of the elements were determined at 460 nm using front exposure.

TABLE III

| | Blue Response of Various Multi-Active Photoconductors | |
|---|---|---|
| Element | Description | Relative Sensitivity* ( = 460 nm) Front Exposure |
| 1 | Prepared according to general procedure using Compound 1 from Table I | 4.6 |
| 2 | Prepared according to general procedure and coated without a compound from Table I | 1.0 |
| 3 | Prepared according to general procedure except formulated and coated without aggregate (included Compound 1 from Table I) | .04 |

*Relative Sensitivity measurement carried out as in Table II.

This data showed that the sensitivity of the multi-active element comprising Compound 1 from Table I is more than the combined sensitivity of elements 2 and 3.

The invention has been described in detail with particular reference to certain especially useful aspects and embodiments thereof, but it will be understood that variations and modifications can be effected within the spirit and scope of the invention.

We claim:

1. A polymeric compound having the following formula

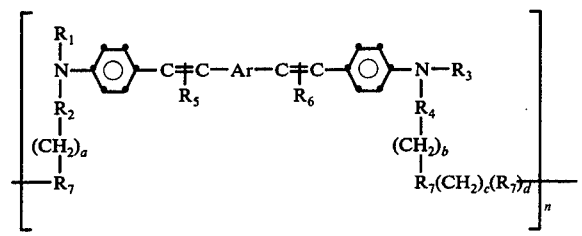

wherein $R_1$, and $R_3$, which may be the same or different, represent a substituted or unsubstituted alkyl group having from 1 to 18 carbon atoms or a substituted or unsubstituted aryl group;

$R_2$ and $R_4$, which may be the same or different, represent an alkylene group having from 2 to 10 carbon atoms or a substituted or unsubstituted arylene group;

$R_5$ and $R_6$ which may be the same or different represent hydrogen or an electron withdrawing group;

$R_7$ can represent oxy, imino, thio, oxycarbonyl, iminocarbonyl, carbonyldioxy, ureylene, carbonyloxycarbonyl, sulfonyl, iminosulfonyl, iminocarbonyloxy;

Ar is an unsubstituted or a substituted aryl group wherein said substituent is an electron donating group or an electron withdrawing group;

$a$, $b$ and $c$ are whole numbers of from 1 to 25;

$d$ is 0 to 1; and $n$ is a whole number having a value of at least 2.

2. A polymeric compound having the following formula

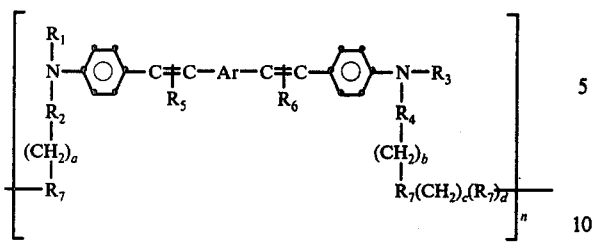 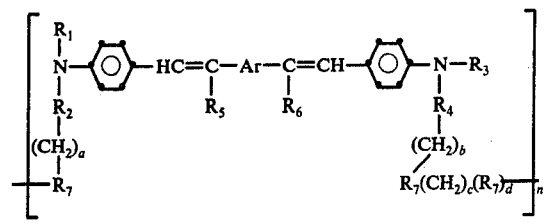

wherein
- $R_1$, and $R_3$, which may be the same or different, represent a substituted or unsubstituted alkyl group having from 1 to 18 carbon atoms or a substituted or unsubstituted aryl group;
- $R_2$ and $R_4$, which may be the same or different, represent an alkylene group having from 2 to 10 carbon atoms or a substituted or unsubstituted arylene group;
- $R_5$ and $R_6$ may be the same or different represent hydrogen or an electron withdrawing group selected from the group consisting of —CN, —$CF_3$, —$NO_2$, —$CO_2R_8$, —$SO_2F$ wherein $R_8$ is an alkyl group having from 1 to 12 carbon atoms;
- $R_7$ can represent oxy, imino, thio, oxycarbonyl, iminocarbonyl, carbonyldioxy, ureylene, carbonyloxycarbonyl, sulfonyl, iminosulfonyl, iminocarbonyloxy;
- Ar represents a substituted or unsubstituted phenylene, naphthylene, or anthrylene wherein said substituent is selected from the group consisting of hydrogen, —CN, —$CO_2R_9$, —$OR_9$, —$CF_3$, —$NO_2$, —Cl, —$SR_9$, and —$R_9$;
- $R_9$ is an alkyl group having from 1 to 12 carbon atoms;
- $a$, $b$ and $c$ are whole numbers of from 1 to 25;
- $d$ is 0 or 1; and
- $n$ is a whole number having a value of from about 2 to about 150.

3. A polymeric compound having the following formula wherein
- $R_1$, and $R_3$, which may be the same or different, represent a substituted or unsubstituted alkyl group having from 1 to 18 carbon atoms or a substituted or unsubstituted aryl group;
- $R_2$ and $R_4$, which may be the same or different, represent an alkylene group having from 2 to 10 carbon atoms or a substituted or unsubstituted arylene group;
- $R_5$ and $R_6$ may be the same or different represent hydrogen or an electron withdrawing group selected from the group consisting of —CN, —$CF_3$, —$NO_2$, —$CO_2R_8$, —$SO_2F$ wherein $R_8$ is an alkyl group having from 1 to 12 carbon atoms;
- $R_7$ can represent oxy, imino, thio, oxycarbonyl, iminocarbonyl, carbonyldioxy, ureylene, carbonyloxycarbonyl, sulfonyl, iminosulfonyl, iminocarbonyloxy;
- Ar represents a substituted or unsubstituted phenylene, naphthylene, or anthrylene wherein said substituent is selected from the group consisting of hydrogen, —CN, —$O_2R_9$, —$OR_9$, —$CF_3$, —$NO_2$, —Cl, —$SR_9$, and —$R_9$;
- $R_9$ is an alkyl group having from 1 to 12 carbon atoms;
- $a$, $b$ and $c$ are whole numbers of from 1 to 25;
- $d$ is 0 or 1; and
- $n$ is a whole number having a value of from about 2 to about 150.

4. A polymeric compound according to claim 3 wherein said compound is selected from the group consisting of

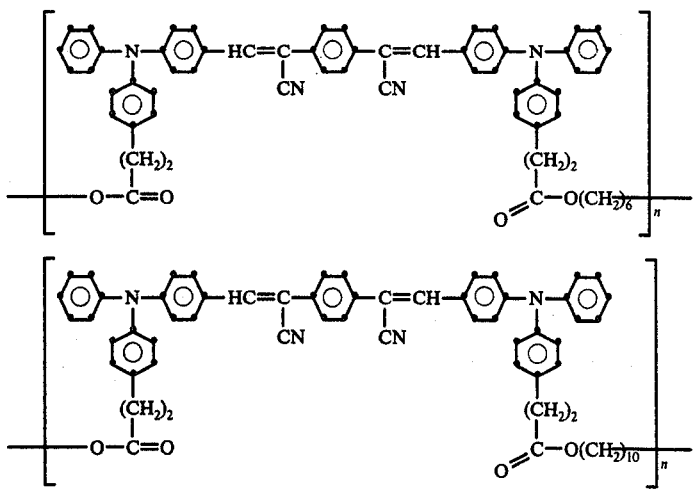

-continued
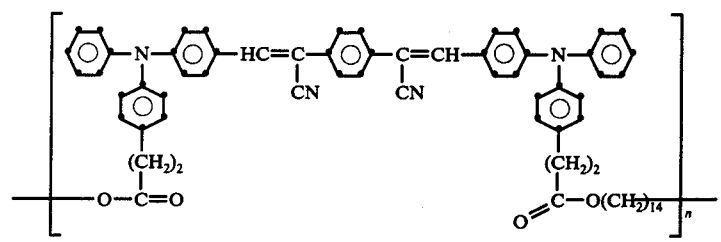
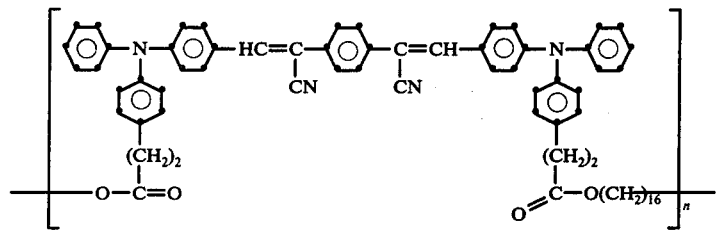
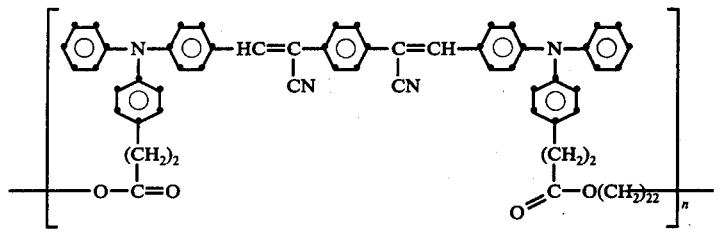
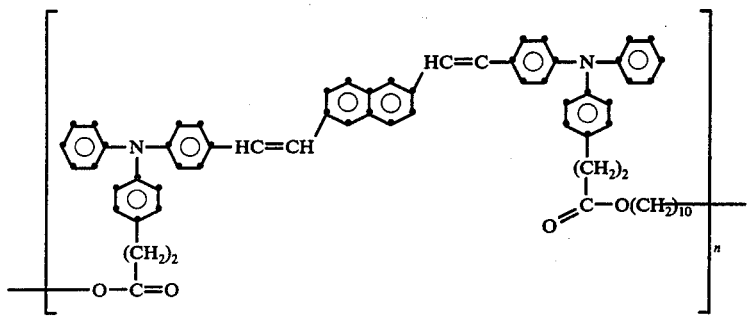
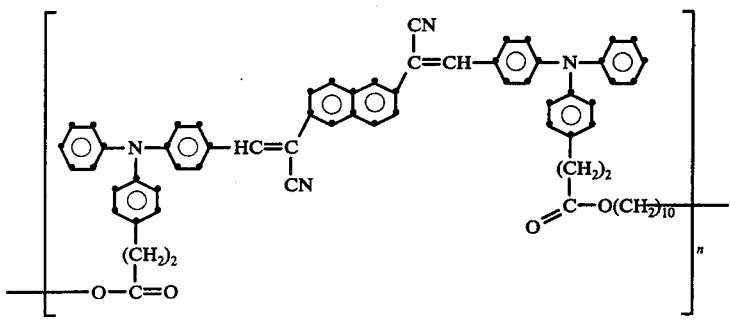
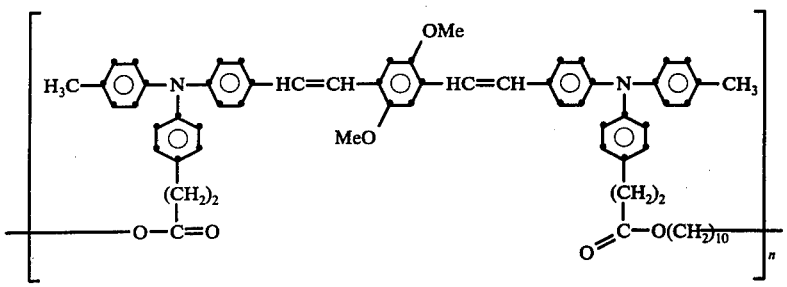

-continued
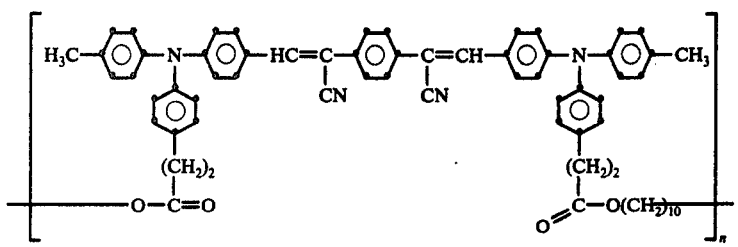
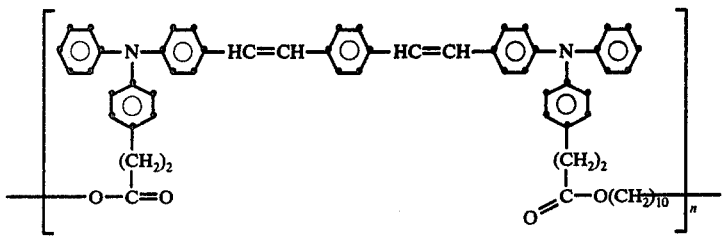
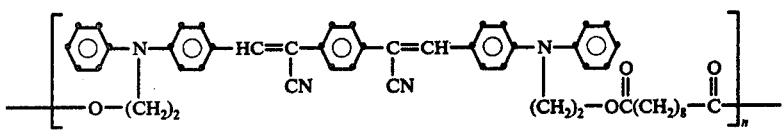
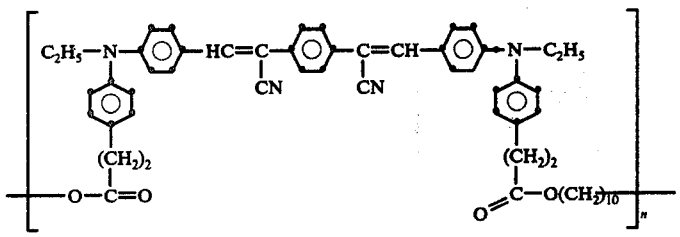
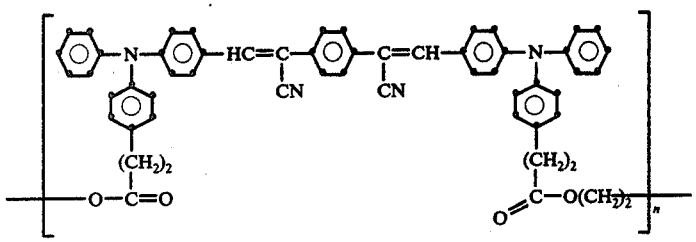
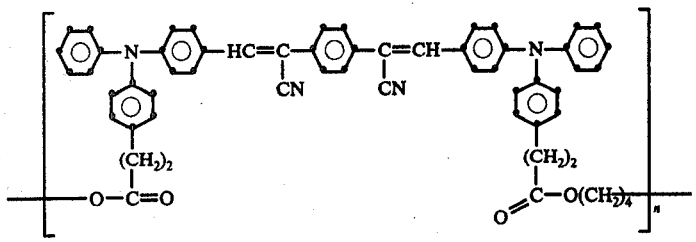
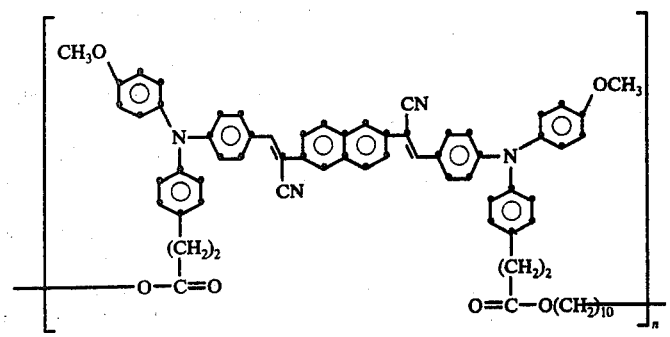

-continued

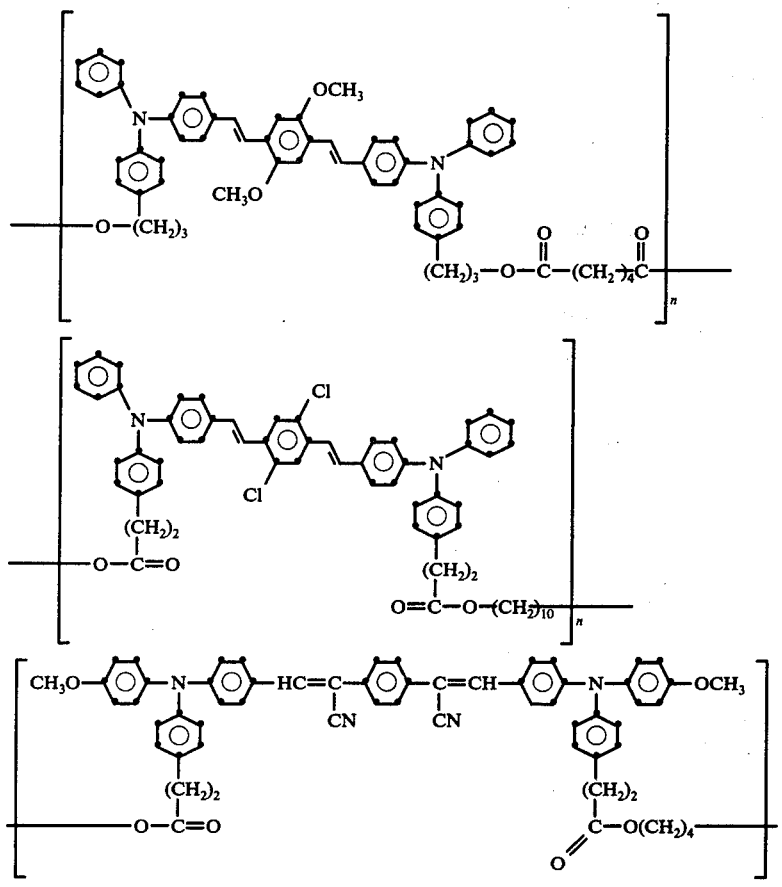

5. A polymeric compound according to claim 1, wherein n has the value of 2 to about 150.

6. A photoconductive insulating element having at least two layers comprising an aggregate photoconductive layer in electrical contact with a photoconductor-containing layer, wherein:
 (a) said photoconductor-containing layer, comprises a material selected from the group consisting of inorganic and organic photoconductors;
 (b) said aggregate photoconductive layer comprising (i) a continuous, electrically insulating polymer phase and (ii) a discontinuous phase dispersed in said continuous phase comprising a finely-divided, particulate co-crystalline complex of at least one polymer having an alkylidene diarylene group in a recurring unit and at least one pyrylium-type dye salt, and (iii) at least one compound having the structure:

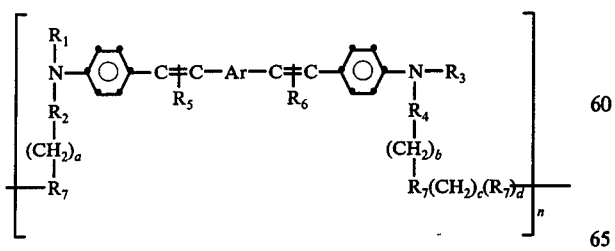

wherein $R_1$, and $R_3$, which may be the same or different, represent a substituted or unsubstituted alkyl group having from 1 to 18 carbon atoms or a substituted or unsubstituted aryl group;

$R_2$ and $R_4$, which may be the same or different, represent an alkylene group having from 2 to 10 carbon atoms or a substituted or unsubstituted arylene group;

$R_5$ and $R_6$ which may be the same or different, represent hydrogen or an electron withdrawing group;

$R_7$ can represent oxy, imino, thio, oxycarbonyl, iminocarbonyl, carbonyldioxy, ureylene, carbonyloxycarbonyl, sulfonyl, iminosulfonyl, iminocarbonyloxy;

Ar is an unsubstituted or a substituted arylene group wherein said substituent is an electron accepting group or an electron withdrawing group;

$a$, $b$ and $c$ are whole numbers of from 1 to 25;

$d$ is 0 or 1; and $n$ is a whole number having a value of at least 2.

7. A multi-active photoconductive element according to claim 6 wherein $R_5$ and $R_6$ may be the same or different represent hydrogen or an electron withdrawing group selected from the group consisting of —CN, —CF$_3$, —NO$_2$, —CO$_2$R$_8$ and —SO$_2$F wherein $R_8$ is an alkyl group having from 1 to 12 carbon atoms;

Ar represents a substituted or unsubstituted phenylene, naphthylene, or anthrylene wherein said substituent is selected from the group consisting of hydrogen, —CN, —CO$_2$R$_9$, —R$_9$, —CF$_3$, —NO$_2$, —Cl, —SR$_9$, and —R$_9$ wherein R$_9$ is an alkyl group having from 1 to 12 carbon atoms; and $n$ has a value of from 1 to 150.

8. A photoconductive insulating element according to claim 7 wherein the photoconductor-containing layer contains an organic photoconductor.

9. A photoconductive insulating element having at least two layers comprising an aggregate photoconductive layer in electrical contact with a photoconductor-containing layer, wherein:
   (a) said photoconductor-containing layer, comprises a material selected from the group consisting of inorganic and organic photoconductors;
   (b) said aggregate photoconductive layer comprising (i) a continuous, electrically insulating polymer phase and (ii) a discontinuous phase dispersed in said continuous phase comprising a finely-divided, particulate co-crystalline complex of at least one polymer having an alkylidene diarylene group in a recurring unit and at least one pyrylium-type dye salt, and (iii) at least one compound having the structure:

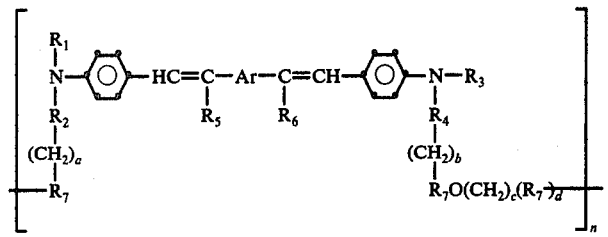

wherein
   R$_1$, and R$_3$, which may be the same or different, represent a substituted or unsubstituted alkyl group having from 1 to 18 carbon atoms or a substituted or unsubstituted aryl group;
   R$_2$ and R$_4$, which may be the same or different, represent an alkylene group having from 2 to 10 carbon atoms or a substituted or unsubstituted arylene group;
   R$_5$ and R$_6$ which may be the same or different represent hydrogen or an electron withdrawing group;
   R$_7$ can represent oxy, imino, thio, oxycarbonyl, iminocarbonyl, carbonyldioxy, ureylene, carbonyloxycarbonyl, sulfonyl, iminosulfonyl, iminocarbonyloxy;
   Ar is an unsubstituted or a substituted arylene group wherein said substituent is an electron accepting group or an electron withdrawing group;
   $a$, $b$ and $c$ are whole numbers of from 1 to 10;

$d$ is 0 or 1; and $n$ is a whole number having a value of at least 2.

10. A multi-active photoconductive element according to claim 9 wherein
   R$_5$ and R$_6$ may be the same or different represent hydrogen or an electron withdrawing group selected from the group consisting of —CN, —CF$_3$, —NO$_2$, —CO$_2$R$_8$ and —SO$_2$F wherein R$_8$ is an alkyl group having from 1 to 12 carbon atoms;
   Ar represents a substituted or unsubstituted phenylene, naphthylene, or anthrylene wherein said substituent is selected from the group consisting of hydrogen, —CN, —CO$_2$R$_9$, —OR$_9$, —CF$_3$, —NO$_2$, —Cl, —SR$_9$, and —R$_9$ wherein R$_9$ is an alkyl group having from 1 to 12 carbon atoms; and $n$ has a value of from 1 to 150.

11. A photoconductive insulating element as in claim 10 wherein the photoconductor-containing layer contains an organic photoconductor.

12. A photoconductive insulating element as in claim 10 wherein said polymeric compound is present in the aggregate photoconductive layer in an amount of about 0.1% to about 50% by weight of said aggregate layer.

13. A photoconductive insulating element as in claim 10 wherein said polymeric compound is present in the aggregate photoconductive layer in an amount of about 5% to about 20% by weight of said aggregate layer.

14. A photoconductive insulating element having at least two layers comprising an aggregate photoconductive layer in electrical contact with a photoconductor-containing layer, wherein:
   (a) said photoconductor-containing layer comprises an organic photoconductive material;
   (b) said aggregate photoconductive layer comprises (i) a continuous electrically insulating polymer phase and (ii) a discontinuous phase dispersed in said continuous electrically insulating phase comprising a finely-divided, particulate co-crystalline complex of at least one polymer having an alkylidene diarylene group in a recurring unit at least one thiopyrylium-type dye salt, said continuous electrically insulating phase comprising and (iii) at least one polymeric sensitizer selected from the group consisting of:

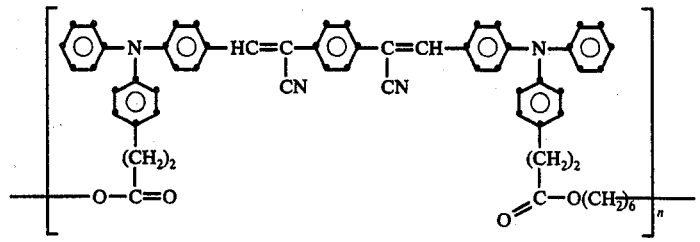

-continued
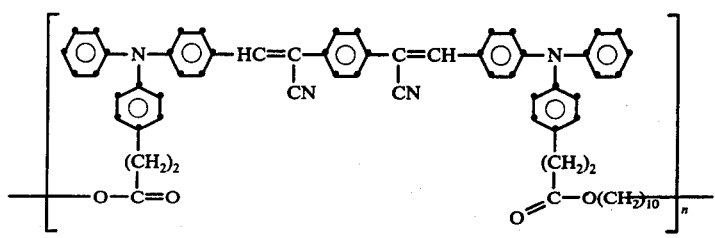
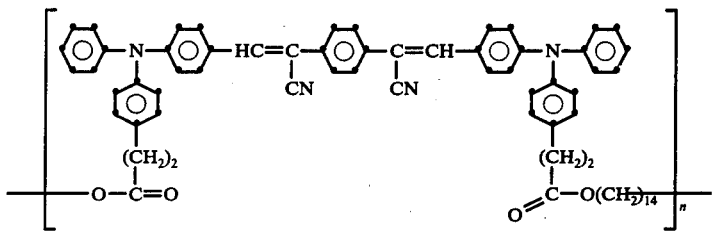
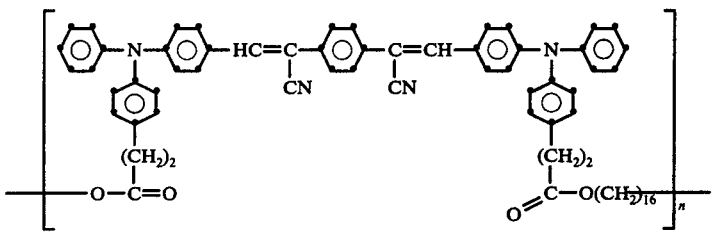
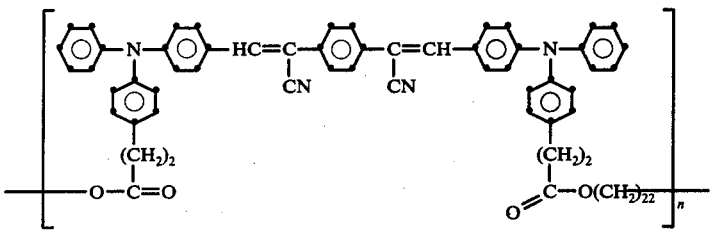
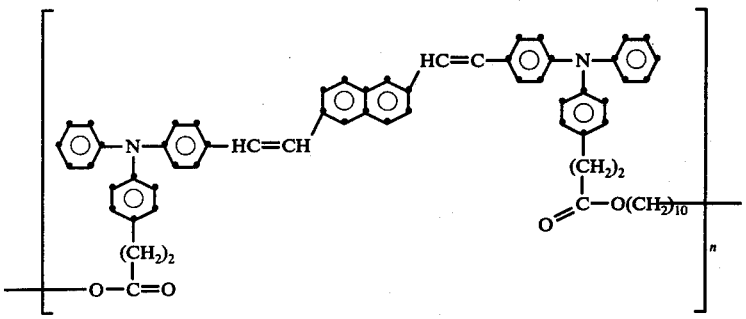
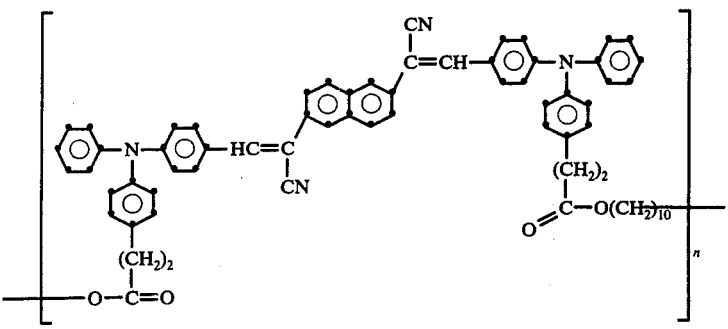

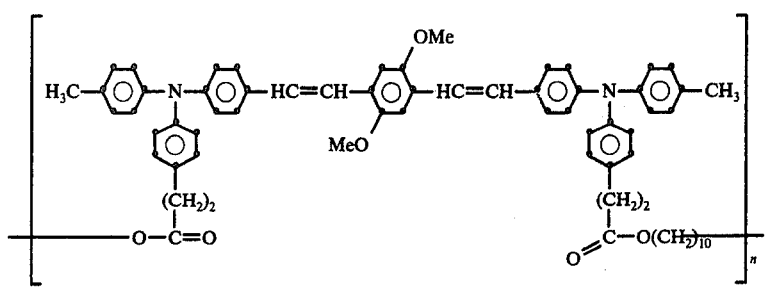
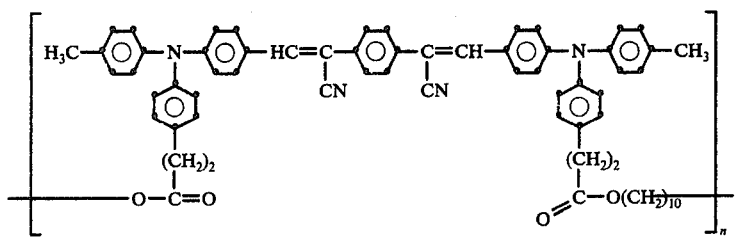
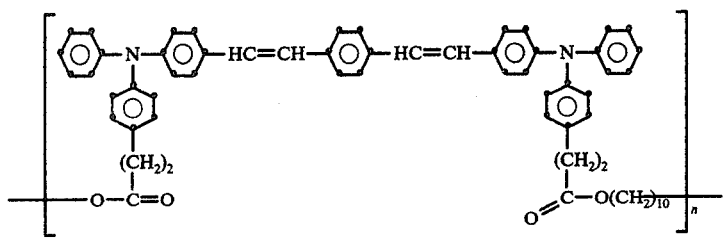
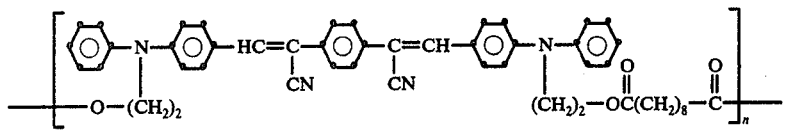
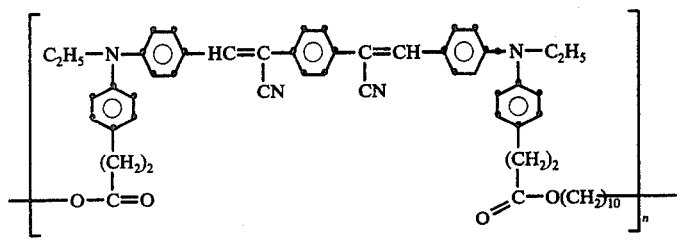
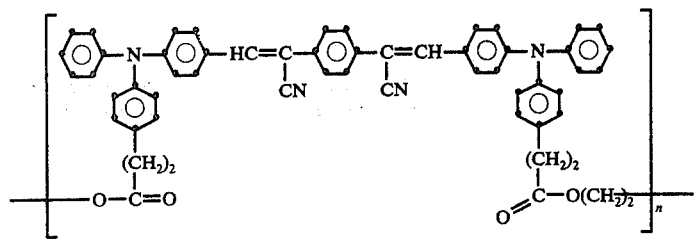
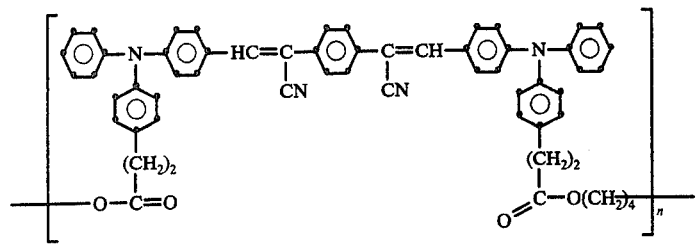

-continued

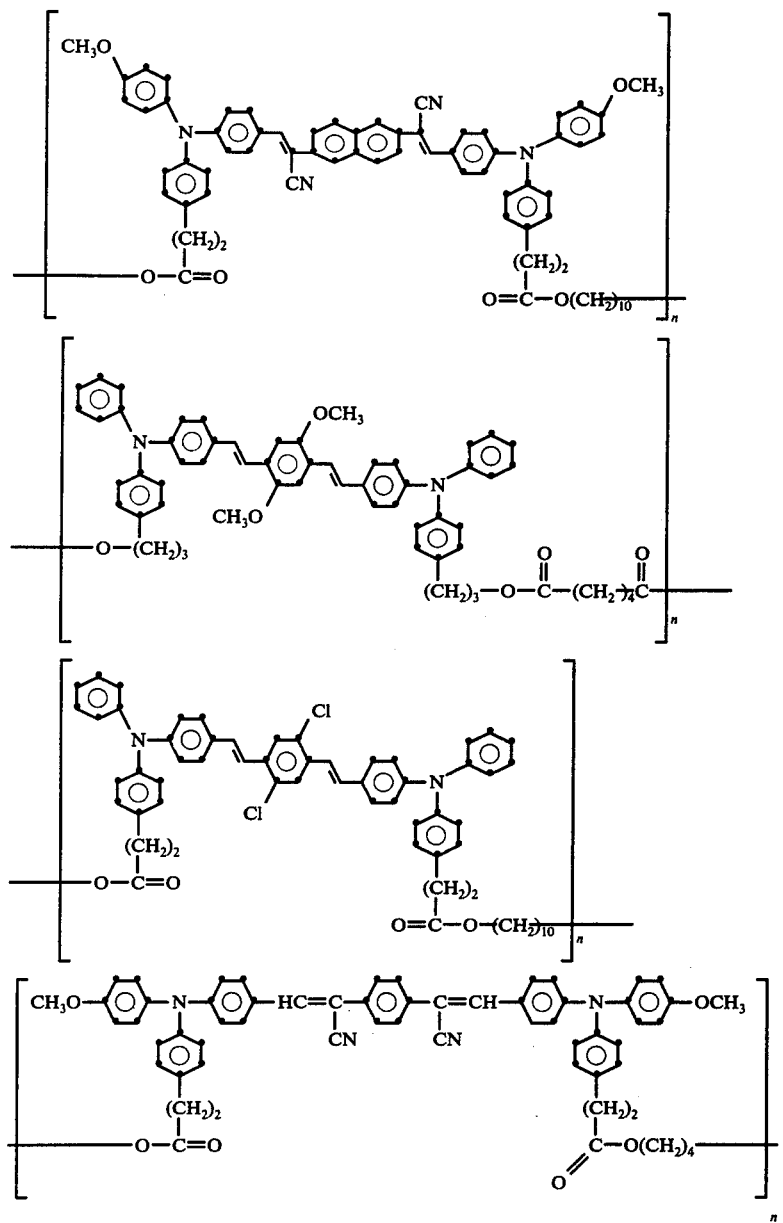

wherein n has the value of 2 to about 150.

15. A photoconductive insulating element according to claim 14 wherein said polymeric compound is present in the aggregate photoconductive layer in an amount of about 0.1% to about 50% by weight of said aggregate layer.

16. A photoconductive insulating element according to claim 14 wherein said polymeric compound is present in the aggregate photoconductive layer in an amount of about 5% to about 20% by weight of said aggregate layer.

* * * * *